United States Patent
Kuo et al.

(10) Patent No.: US 7,228,839 B2
(45) Date of Patent: Jun. 12, 2007

(54) NOX EMISSION CONTROL FOR A CONTROLLED AUTO-IGNITION FOUR-STROKE INTERNAL COMBUSTION ENGINE

(75) Inventors: Tang-Wei Kuo, Troy, MI (US); Paul M. Najt, Bloomfield Hills, MI (US); James A. Eng, Troy, MI (US); Barry L. Brown, Lake Orion, MI (US); Chen-Fang Chang, Troy, MI (US); Jun-Mo Kang, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 6 days.

(21) Appl. No.: 11/172,505

(22) Filed: Jun. 30, 2005

(65) Prior Publication Data

US 2006/0016417 A1 Jan. 26, 2006

Related U.S. Application Data

(60) Provisional application No. 60/591,064, filed on Jul. 26, 2004.

(51) Int. Cl.
*F01L 1/34* (2006.01)
*F02B 3/00* (2006.01)
*F02M 25/07* (2006.01)

(52) U.S. Cl. .............. 123/294; 123/90.15; 123/568.14

(58) Field of Classification Search ............... 123/435, 123/443, 703, 295, 305, 480, 294, 90.15, 123/568.14; 701/102, 103, 104, 105, 108, 701/115

See application file for complete search history.

(56) References Cited

U.S. PATENT DOCUMENTS

| 6,082,342 | A | 7/2000 | Duret et al. | |
|---|---|---|---|---|
| 6,267,097 | B1* | 7/2001 | Urushihara et al. | 123/305 |
| 6,386,177 | B2 | 5/2002 | Urushihara et al. | |
| 2003/0110760 | A1* | 6/2003 | Shirakawa | 60/278 |

FOREIGN PATENT DOCUMENTS

| WO | WO0146571 | 6/2001 |
|---|---|---|
| WO | WO0146572 | 6/2001 |
| WO | WO0146573 | 6/2001 |

* cited by examiner

*Primary Examiner*—Stephen K. Cronin
*Assistant Examiner*—Johnny H. Hoang
(74) *Attorney, Agent, or Firm*—Kathryn A. Marra

(57) ABSTRACT

A four-stroke internal combustion engine is operated in controlled auto-ignition mode by any of a variety of valve control strategies conducive to controlled auto-ignition conditions in conjunction with in-cylinder fuel charges that are at either stoichiometric or lean of stoichiometric air-fuel ratios. A measure of engine NOx emission is provided and when it crosses a predetermined threshold, the in-cylinder fuel charge is transitioned from the operative one of the stoichiometric or lean of stoichiometric air-fuel ratios to the inoperative one of the stoichiometric or lean of stoichiometric air-fuel ratios.

36 Claims, 14 Drawing Sheets

CRANK ANGLE (Related Art)

NOX EMISSION CONTROL FOR A CONTROLLED AUTO-IGNITION FOUR-STROKE INTERNAL COMBUSTION ENGINE

CROSS-REFERENCE TO RELATED APPLICATIONS

This application claims priority from U.S. Provisional Patent Application No. 60/591,064 filed Jul. 26, 2004.

TECHNICAL FIELD

The present invention is related to operating a four-stroke internal combustion engine.

BACKGROUND OF THE INVENTION

The automotive industry is continually researching new ways of improving the combustion process of the internal combustion engine in an effort to improve fuel economy, meet or exceed emission regulatory targets, and to meet or exceed consumer expectations regarding emissions, fuel economy and product differentiation.

Most modern conventional gasoline internal combustion engines attempt to operate around stoichiometric conditions. That is to say providing an optimal air/fuel ratio of substantially 14.6 to 1 that results in substantially complete consumption of the fuel and oxygen delivered to the engine. Such operation allows for exhaust gas aftertreatment by 3-way catalysts which clean up any unconsumed fuel (HC) and combustion byproducts such as NOx and CO. Most modern engines are fuel injected having either throttle body injection (TBI) or multi-port fuel injection (MPFI) wherein each of a plurality of injectors is located proximate an intake port at each cylinder of a multi-cylinder engine. Better air/fuel ratio control is achieved with a MPFI arrangement; however, conditions such as wall wetting and intake runner dynamics limit the precision with which such control is achieved. Fuel delivery precision can be improved by direct in-cylinder injection (DI). So called linear oxygen sensors provide a higher degree of control capability and, when coupled with DI, suggest an attractive system with improved cylinder-to-cylinder air/fuel ratio control capability. However, in-cylinder combustion dynamics then become more important and combustion quality plays an increasingly important role in controlling emissions. As such, engine manufacturers have concentrated on such things as injector spray patterns, intake swirl, and piston geometry to effect improved in-cylinder air/fuel mixing and homogeneity.

While stoichiometric gasoline four-stroke engine and 3-way catalyst systems have the potential to meet ultra-low emission targets, efficiency of such systems lags behind so-called lean-burn systems. Lean-burn systems also show promise in meeting emission targets for NOx through combustion controls, including high exhaust gas dilution and emerging NOx aftertreatment technologies. However, lean-burn systems still face other hurdles, for example, combustion quality and combustion stability particularly at part load operating points and high exhaust gas dilution. Additionally, emerging NOx aftertreatment technologies may require periodic reductant delivery (e.g. fuel) to regenerate the aftertreatment device, thereby compromising the net fuel consumption benefits afforded during lean engine operation.

Lean-burn engines, at a most basic level, include all internal combustion engines operated with air in excess of that required for the combustion of the fuel charge provided. A variety of fueling and ignition methodologies differentiate lean-burn topologies. Spark ignited systems (SI) initiate combustion by providing an electrical discharge in the combustion chamber. Compression ignition systems (CI) initiate combustion with combustion chamber conditions including combinations of air/fuel ratio, temperature and pressure among others. Fueling methods may include TBI, MPFI and DI. Homogeneous charge systems are characterized by very consistent and well vaporized fuel distribution within the air/fuel mixture as may be achieved by MPFI or direct injection early in the intake cycle. Stratified charge systems are characterized by less well vaporized and distributed fuel within the air/fuel mixture and are typically associated with direct injection of fuel late in the compression cycle.

Known gasoline DI engines may selectively be operated under homogeneous spark ignition or stratified spark ignition modes. A homogeneous spark ignited mode is generally selected for higher load conditions while a stratified spark ignition mode is generally selected for lower load conditions.

Certain DI compression ignition engines utilize a substantially homogeneous mixture of preheated air and fuel and establish pressure and temperature conditions during engine compression strokes that cause ignition without the necessity for additional spark energy. This process is sometimes called controlled auto-ignition. Controlled auto-ignition is a predictable process and thus differs from undesirable pre-ignition events sometimes associated with spark-ignition engines. Controlled auto-ignition also differs from well-known compression ignition in diesel engines wherein fuel ignites substantially immediately upon injection into a highly pre-compressed, high temperature charge of air, whereas in the controlled auto-ignition process the preheated air and fuel are mixed together prior to combustion during intake events and generally at compression profiles consistent with conventional spark ignited four-stroke engine systems.

Four-stroke internal combustion engines have been proposed which provide for auto-ignition by controlling the motion of the intake and exhaust valves associated with a combustion chamber to ensure that a air/fuel charge is mixed with combusted gases to generate conditions suitable for auto-ignition without the necessity for externally pre-heating intake air or cylinder charge or for high compression profiles. In this regard, certain engines have been proposed having a cam-actuated exhaust valve that is closed significantly later in the four-stroke cycle than is conventional in a spark-ignited four-stroke engine to allow for substantial overlap of the open exhaust valve with an open intake valve whereby previously expelled combusted gases are drawn back into the combustion chamber early during the intake cycle. Certain other engines have been proposed that have an exhaust valve that is closed significantly earlier in the exhaust cycle thereby trapping combusted gases for subsequent mixing with fuel and air during the intake cycle. In both such engines the exhaust and intake valves are opened only once in each four-stroke cycle. Certain other engines have been proposed having a hydraulically controlled exhaust valve that is opened twice during each four-stroke cycle—once to expel combusted gases from the combustion chamber into the exhaust passage during the exhaust cycle and once to draw back combusted gases from the exhaust passage into the combustion chamber late during the intake cycle. These engines variously utilize throttle body, port or direct combustion chamber fuel injection.

However advantageous such lean-burn engine systems appear to be, certain shortfalls with respect to combustion quality, combustion stability and NOx emissions, particularly at part load operating points and high exhaust gas dilution, continue to exist. Such shortfalls lead to undesirable compromises including limitations on how much a fuel charge can effectively be reduced during part load operating points while still maintaining acceptable combustion quality and stability characteristics and limitations on net fuel consumption.

SUMMARY OF THE INVENTION

The present invention is a method of controlling a four-stroke internal combustion engine being operated in a controlled auto-ignition mode. The engine includes a variable volume combustion chamber defined by a piston reciprocating within a cylinder between top-dead center and bottom-dead center points, intake and exhaust passages, a fuel deliver system and intake and exhaust valves controlled during repetitive, sequential exhaust, intake, compression and expansion strokes of the piston. A variable valve system and fuel delivery system are cooperatively operated to effect controlled auto-ignition with in-cylinder fuel charges that are at either stoichiometric or lean of stoichiometric air-fuel ratios. A measure of engine NOx emission is provided and when it crosses a predetermined threshold, the in-cylinder fuel charge is transitioned from the operative one of the stoichiometric or lean of stoichiometric air-fuel ratios to the inoperative one of the stoichiometric or lean of stoichiometric air-fuel ratios.

More particularly, the measure of NOx emission may be provided by a look-up table correlating fueling rate to the measure of NOx emission, by a NOx sensor or by a look-up table correlating engine knock to the measure of NOx emission, for example.

Variable valve system control to effect controlled auto-ignition in-cylinder conditions may include, for example, establishment of a sub-atmospheric pressure condition within the combustion chamber during at least a portion of the intake stroke. Such valve control is also preferably coupled with the recirculation of exhaust gases into the combustion chamber such as by internal or external means including trapping exhaust gases within the combustion chamber through early exhaust valve closing, re-breathing of exhaust gases through either exhaust or intake valves, or through external exhaust gas recirculation means. Variable valve system control to effect controlled auto-ignition in-cylinder conditions may alternatively include, for example, trapping and recompression of a portion of combusted gases within the combustion chamber.

The fuel transition control may be practiced with various combinations of the alternative NOx emission measurements and valve control strategies described herein.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
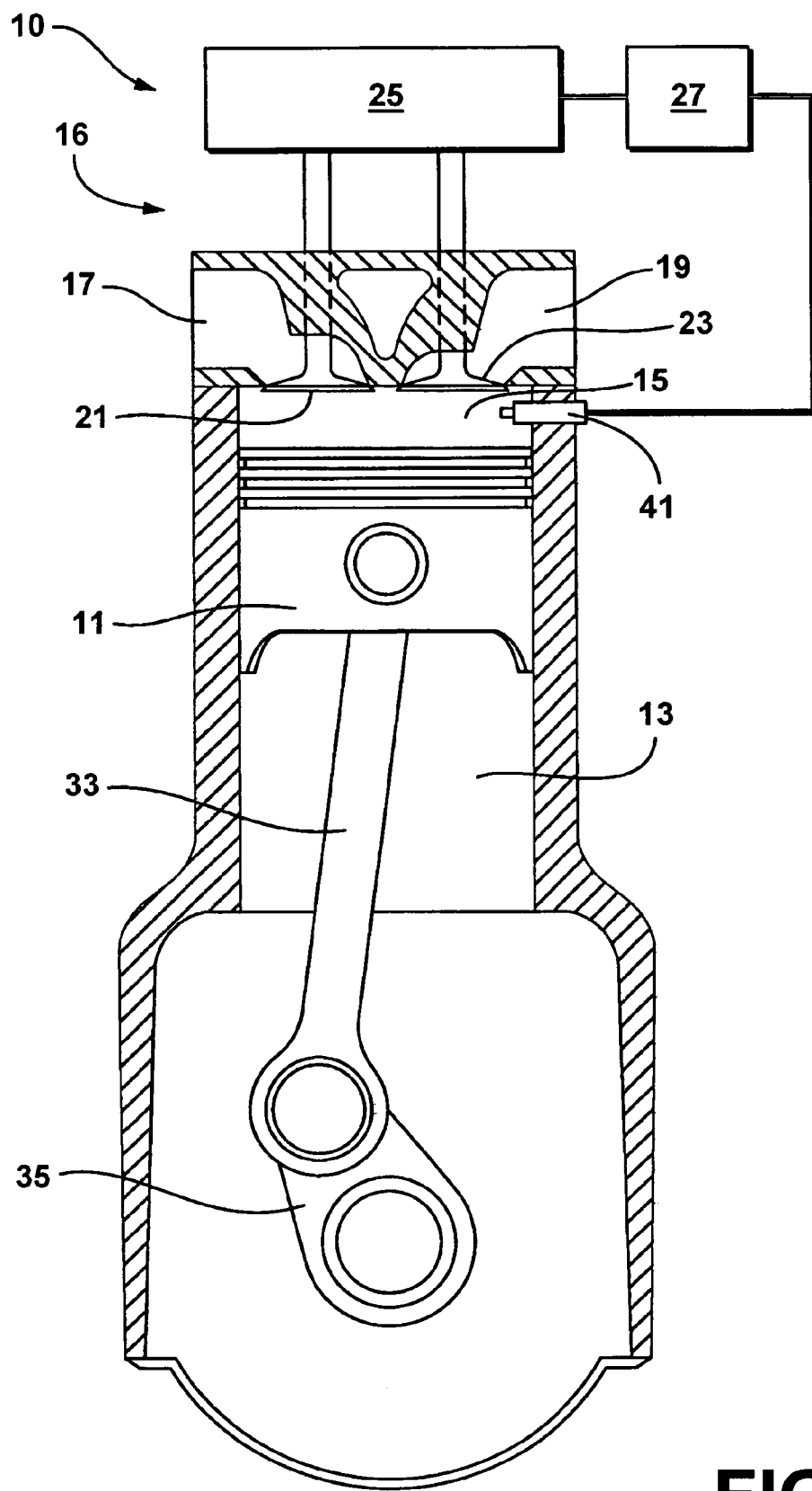
FIG. 1 is a schematic illustration of a single cylinder, direct-injection, four-stroke internal combustion engine in accordance with the present invention.

With reference first to FIG. 1, an exemplary single cylinder four-stroke internal combustion engine system (engine) 10 suited for implementation of the present invention is schematically illustrated. It is to be appreciated that the present invention is equally applicable to a multi-cylinder four-stroke internal combustion engine. The present exemplary engine 10 is shown configured for direct combustion chamber injection (direct injection) of fuel vis-à-vis fuel injector 41. Alternative fueling strategies including port fuel injection or throttle body fuel injection may also be used in conjunction with certain aspects of the present invention; however, the preferred approach is direct injection. Similarly, while widely available grades of gasoline and light ethanol blends thereof are preferred fuels, alternative liquid and gaseous fuels such as higher ethanol blends (e.g. E80, E85), neat ethanol (E99), neat methanol (M100), natural gas, hydrogen, biogas, various reformates, syngases etc. may also be used in the implementation of the present invention.

With respect to the base engine, a piston 11 is movable in a cylinder 13 and defines therein a variable volume combustion chamber 15. Piston 11 is connected to crankshaft 35 through connecting rod 33 and reciprocally drives or is reciprocally driven by crankshaft 35. Engine 10 also includes valve train 16 illustrated with a single intake valve 21 and a single exhaust valve 23, though multiple intake and exhaust valve variations are equally applicable for utilization with the present invention. Valve train 16 also includes valve actuation means 25 which may take any of a variety of forms including electrically controlled hydraulic or electromechanical actuation (a.k.a. fully flexible valve actuation, FFVA) and multi-profile cams (a.k.a. multi-lobe, multi-step) and selection mechanisms, cam phasers and other mechanically variable valve actuation technologies implemented individually or in combination. Intake passage 17 supplies air into the combustion chamber 15. The flow of the air into the combustion chamber 15 is controlled by intake valve 21 during intake events. Combusted gases are expelled from the combustion chamber 15 through exhaust passage 19 with flow controlled by exhaust valve 23 during exhaust events.

Engine control is provided by computer based control 27 which may take the form of conventional hardware configurations and combinations including powertrain controllers, engine controllers and digital signal processors in integrated or distributed architectures. In general, control 27 includes at least one microprocessor, ROM, RAM, and various I/O devices including A/D and D/A converters and power drive circuitry. Control 27 also specifically includes controls for valve actuation means 25 and fuel injector 41. Controller 27 includes the monitoring of a plurality of engine related inputs from a plurality of transduced sources including engine coolant temperature, outside air temperature, manifold air temperature, operator torque requests, ambient pressure, manifold pressure in throttled applications, displacement and position sensors such as for valve train and engine crankshaft quantities, and further includes the generation of control commands for a variety of actuators as well as the performance of general diagnostic functions. While illustrated and described as integral with controller 27, the control and power electronics associated with valve actuation means 25 and fuel injector 41 may be incorporated as part of distributed smart actuation scheme wherein certain monitoring and control functionality related to respective subsystems are implemented by programmable distributed controllers associated with such respective valve and fuel control subsystems.

Figure 2:
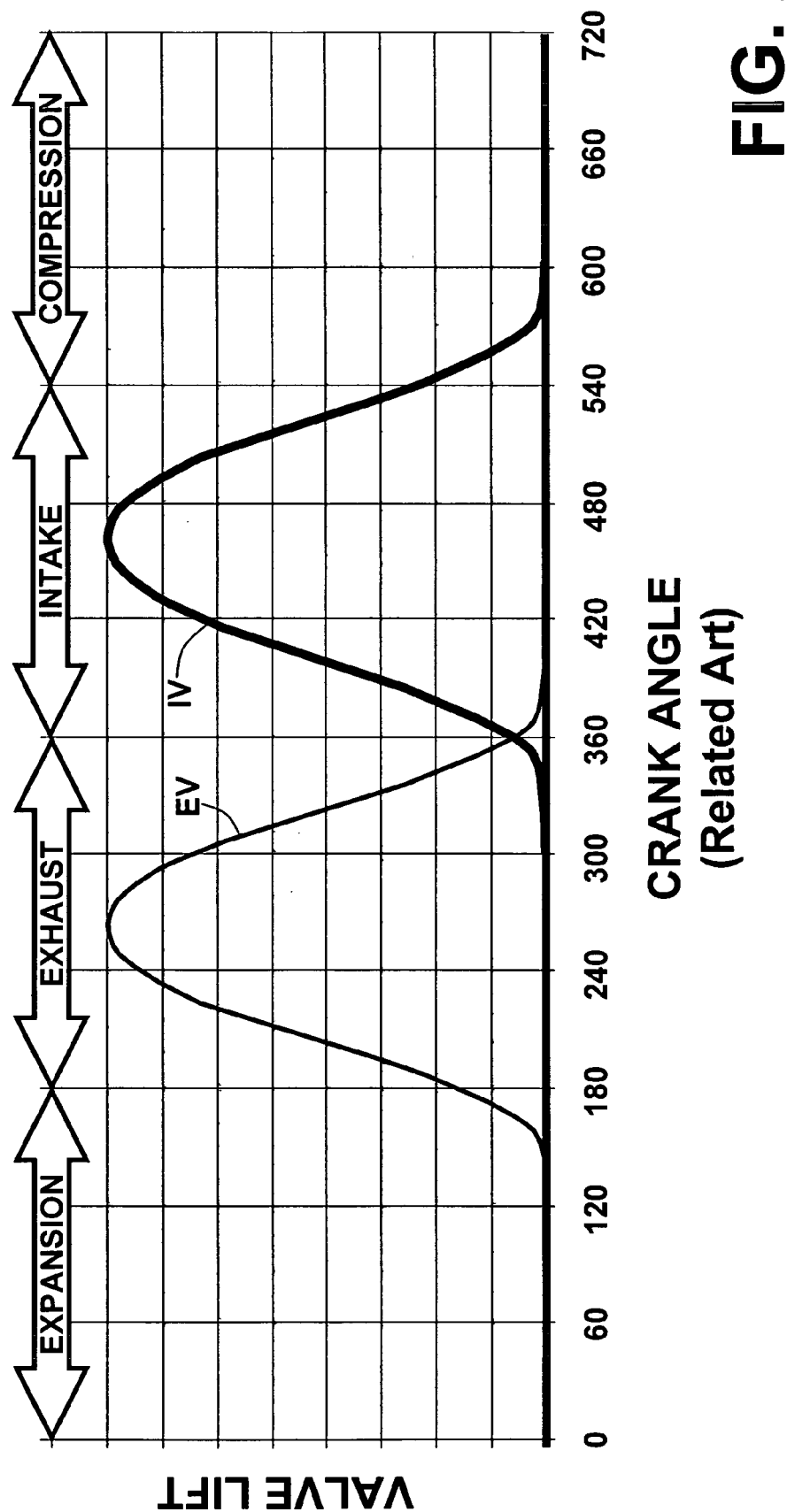
FIG. 2 illustrates valve lift versus crank angle curves corresponding to related art exhaust and intake valve phasing of a conventional spark-ignited, internal combustion engine.

Having thus described the environment and certain application hardware suitable for implementing the present invention, attention is now directed toward FIGS. 2–15. In FIG. 2, conventional or baseline spark-ignited internal combustion engine valve lifts of the intake and exhaust valves are plotted against a complete four-stroke combustion cycle. In this and subsequent figures, exhaust valve schedules (EV) are illustrated with narrow lines whereas intake valve schedules (IV) are illustrated with thick lines. A full 720 degrees or two revolutions of the crankshaft are plotted against the horizontal axis beginning at 0 degrees corresponding to top dead center (TDC) combustion (i.e. position of the piston at the beginning of the expansion stroke (end of the compression stroke), and ending at 720 degrees corresponding to the same top dead center position at the end of the compression stroke (beginning of the expansion stroke). By convention and as followed herein, the crankshaft angular positions 0 through 720 refer to degrees of crankshaft rotation ATDC combustion. The sequentially repeated cycles are delineated across the top of the figure within double-ended arrows labeled EXPANSION, EXHAUST, INTAKE and COMPRESSION. Each of these cycles correspond to the piston motion between respective ones of top dead and bottom dead center positions and covers a full 180 degrees of crankshaft rotation or one-quarter of the complete four-stroke cycle.

In the present exemplary exposition of the invention, a four-stroke, single cylinder, 0.55 liter, controlled auto-ignition, gasoline direct injection fueled internal combustion engine was utilized in implementing the valve and fueling controls and acquisition of the various data embodied herein. Unless specifically discussed otherwise, all such implementations and acquisitions are assumed to be carried out under standard conditions as understood by one having ordinary skill in the art.

In accordance with certain valve control aspects of the present invention, during part load operation of the engine a low pressure event is established within the combustion chamber, preferably by means of FFVA or phase control valve actuation controlling the opening and closing of one or more of the intake and exhaust valves. As used herein, part load operation corresponds to engine load below mid-load of about 450 kPa net mean effective pressure. Low part load as used herein corresponds to engine load below about 125 kPa net mean effective pressure. Intermediate part load as used herein corresponds to engine load from about 125 to about 200 kPa net mean effective pressure. And, high part load as used herein corresponds to engine load from about 200 to about 450 kPa net mean effective pressure.

Figure 3:
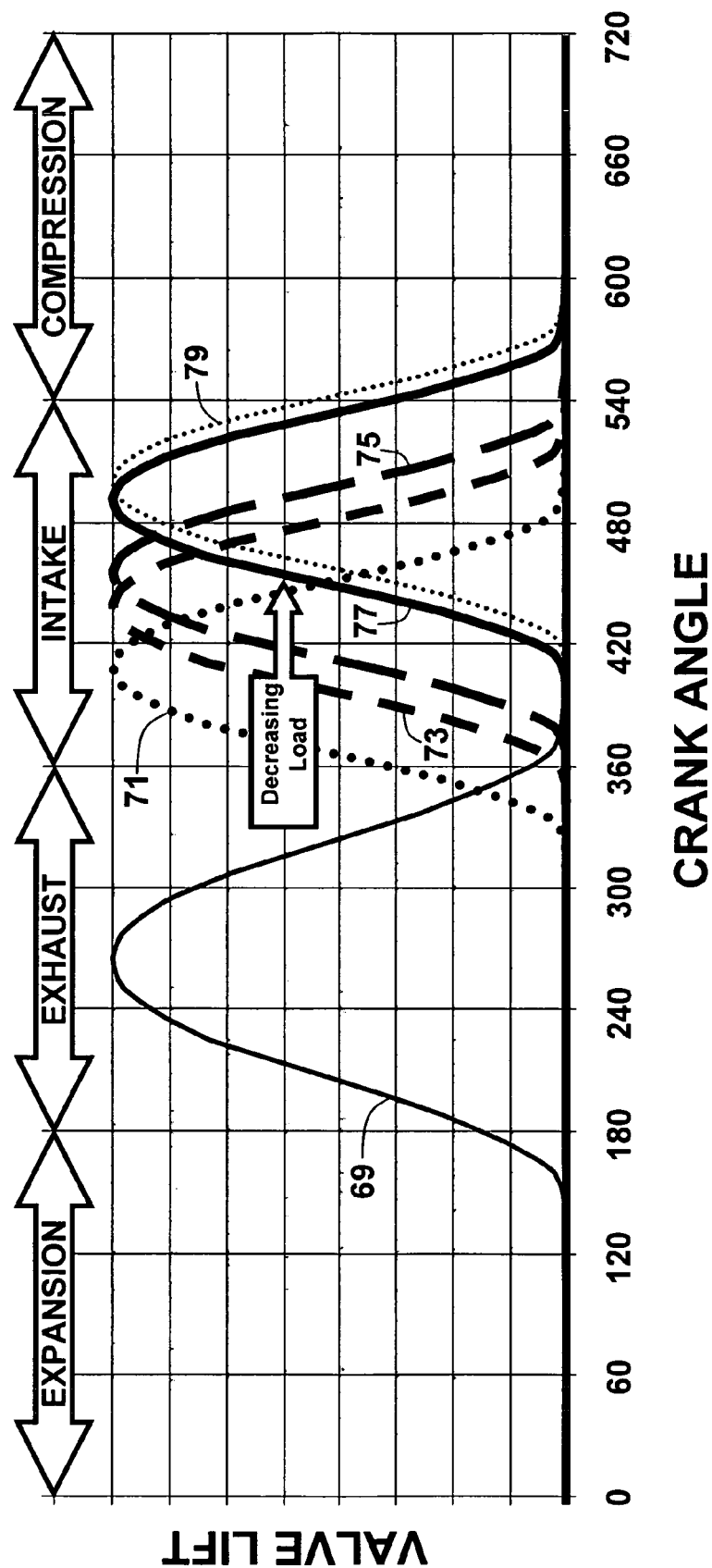
FIG. 3 illustrates various exhaust and intake valve phase and lift versus crank angle curves and preferred trend correspondence to engine load corresponding to the single cylinder engine of FIG. 1 with phase controlled valve actuation for effecting desired in cylinder conditions in accordance with exhaust re-breathe aspects of the present invention.
Figure 6:
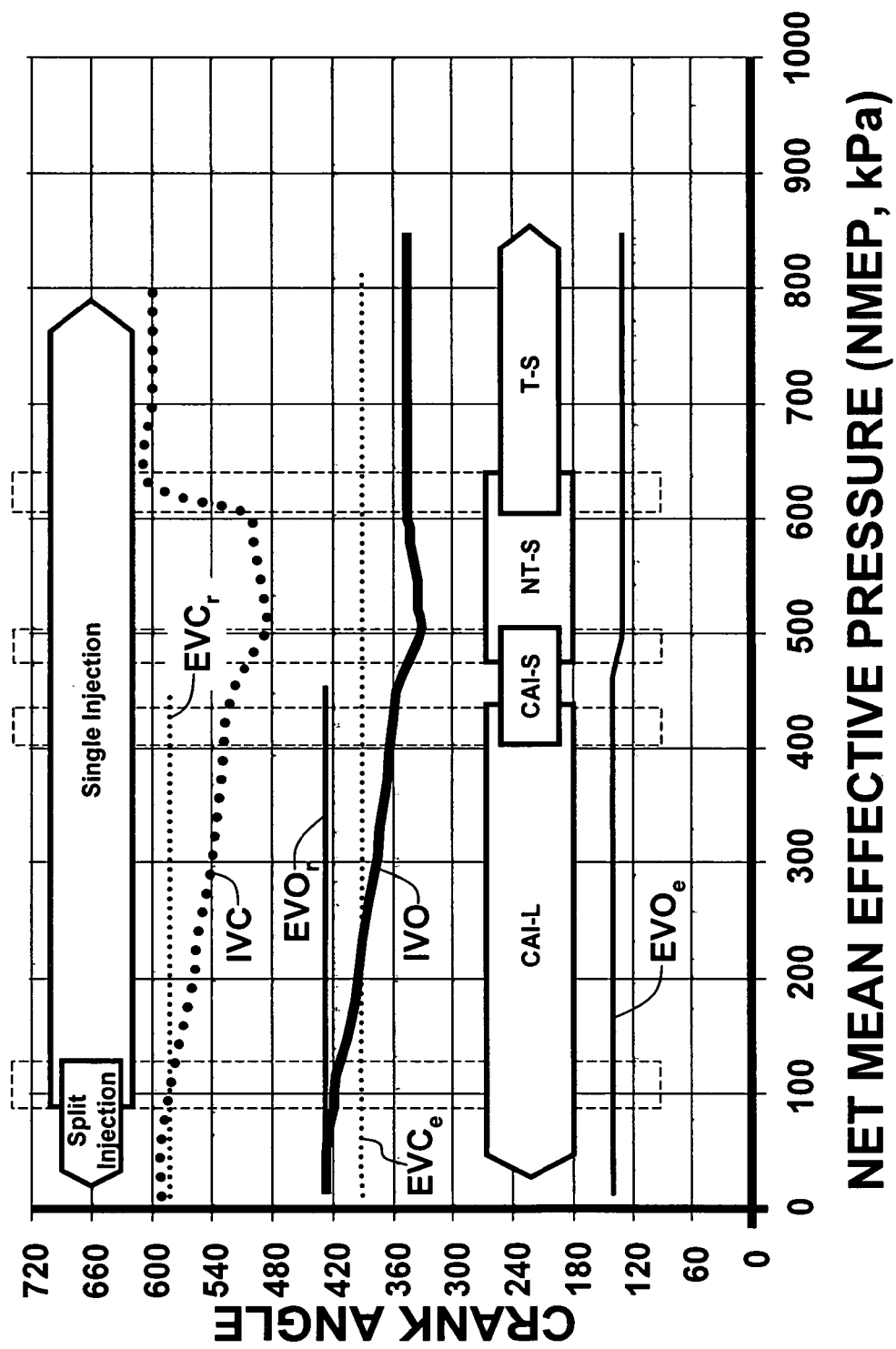
FIG. 6 illustrates exemplary valve timing effected by phase controlled valve actuation, fuel injection strategies and combustion modes versus part load regions of engine operation in accordance with the present invention.

FIGS. 3 and 6 illustrate a phase control valve actuation topology implementation of the present invention to effect the combusted gas re-breathe aspects thereof. Therein, hydraulically controlled valve lift mechanisms together with cam phaser mechanisms, both of well known varieties, provide the intake valve phase shifting and exhaust valve re-breathe event lift to effect the desired combustion chamber conditions in accordance with the present invention. The intake valve schedule is illustrated with an exemplary intake duration of substantially 165 degrees at individual phase shifted positions variously labeled 71, 73, 75 and 77 from more advanced to more retarded phasing.

Low pressure is established within the combustion chamber vis-à-vis intake valve phase shifting controlling the opening of the intake valve relative to the closing of the exhaust valve at the end of the exhaust event. In the present example illustrated in FIG. 3, it is assumed that an exhaust event is caused to occur wherein the exhaust valve is opened for at least a portion of the exhaust stroke from 180 to 360 degrees. The actual opening and closing angles of the exhaust valve during an exhaust event will vary in accordance with such factors as engine speed or load and exhaust runner geometries as well as other desired engine tuning characteristics. In the present illustrated example the exhaust valve closure is assumed to correspond substantially to 380 degrees ATDC combustion or 20 degrees after exhaust stroke TDC. Preferably, the exhaust valve closure occurs within approximately 20 degrees before exhaust stroke TDC to 20 degrees after exhaust stroke TDC. It is generally believed that maximum expulsion of exhaust gases from the combustion chamber will aid in minimizing residual cylinder pressure and such condition is generally consistent with effectuating deeper and longer duration low pressure events. Through certain gas dynamics under certain conditions, maximum expulsion occurs when the exhaust valve remains open for some angle after exhaust stroke TDC. More preferably, then, the exhaust valve closure occurs within approximately exhaust stroke TDC to 20 degrees after exhaust stroke TDC, particularly at the lowest engine loads whereat lower in cylinder pressure conditions are desired in accordance with the present invention.

Consistent with the objective of establishing a low pressure event within the combustion chamber during the intake stroke it may further be desirable that the exhaust event exhaust valve closure absolute phase before exhaust stroke TDC is not greater than the intake valve opening phase after exhaust stroke TDC, or that minimal valve overlap exists. Generally a certain degree of asymmetry around exhaust stroke TDC as between exhaust valve closure and intake valve opening as described is required in order to establish the desired low pressure conditions within the combustion chamber. If exhaust event exhaust valve closure occurs before exhaust stroke TDC, then it may be desirable to allow at least a similar angle after TDC for the pressure in the combustion chamber to relax before the intake valve begins to open. Preferably, the intake valve opening during an intake event follows the exhaust valve closing at about 30 to about 90 degrees after exhaust stroke TDC at low part load operating points.

These characteristics of intake and exhaust valve phasings heretofore described are substantially set forth in the exemplary curves illustrated in FIG. 3. Exhaust profile 69 represents an exhaust event exhaust valve profile wherein valve closure occurs at substantially 20 degrees after exhaust stroke TDC. For purposes of exposition it is assumed that the exhaust event is substantially static with respect to exhaust event exhaust valve closure phasing although, as described previously, it is contemplated that phase shifting of the exhaust valve profile is within the scope of the invention in attaining various outcomes and objectives thereof. Intake profile 77 corresponds to intake valve opening at substantially 40 degree after exhaust stroke top dead center and closing at substantially 25 degrees after intake stroke bottom dead center to effect one level of in cylinder vacuum. Intake profiles 75, 73 and 71 correspond to earlier intake valve openings at substantially 20-degrees after, at and 30 degrees before exhaust stroke top dead center, respectively. Corresponding intake valve closings for profiles 75, 73 and 71 are at substantially 5 degrees after, 15 degrees before and 45 degrees before intake stroke bottom dead center, respectively. In accordance with the objective of effecting decreasing cylinder pressures at progressively lower engine loads, the trend of the phase curves follows the decreasing load arrow shown in the figure.

If a continuum of such intake profiles were plotted in the figure with intake valve opening limits at less retarded and more retarded phase angles, the result would be varying vacuum levels and durations thereof within the combustion chamber. Of course, in addition to the various low pressure profiles within the combustion chamber which can be achieved with simply phase shifting valve openings as described, additional pressure profiles may be achieved through more complex and independent variations of the exhaust and intake profiles including by way of lift variation in addition to timing. Additional details respecting varying vacuum levels is set forth in additional detail in commonly assigned and co-pending U.S. patent application Ser. No. 10/611,845 (now U.S. Pat. No. 7,004,124; Ser. No. 10/611,366 (now U.S. Pat. No. 6,983,732); Ser. Nos. 10/899,442,; 10/899,443; and, Ser. No. 10/899,456 (now U.S. Pat. No. 7,021,277), the contents of which are incorporated herein by reference.

Figure 4:
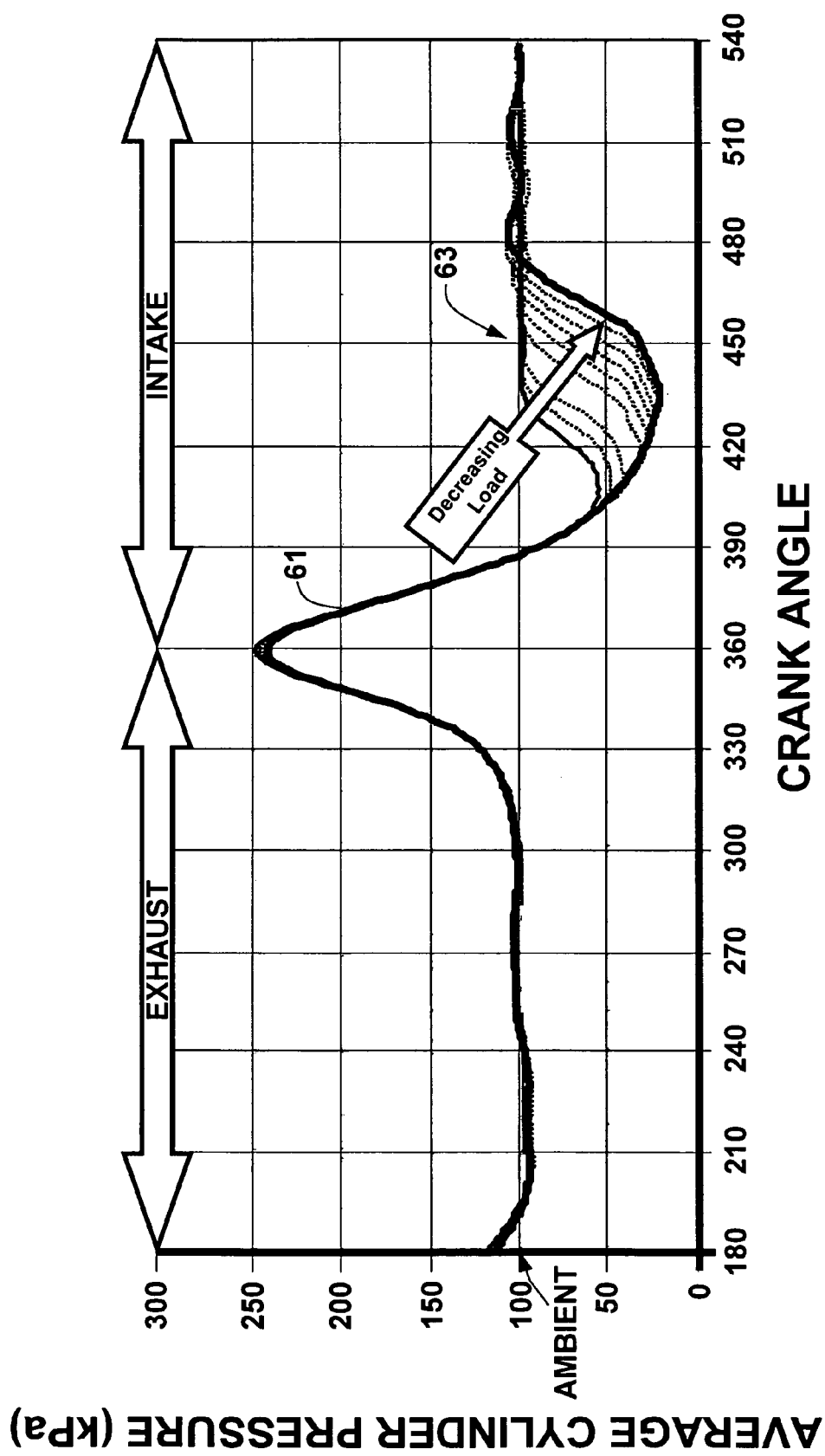
FIG. 4 illustrates various cylinder pressure versus crank angle curves and preferred trend correspondence to engine load for effecting desired in cylinder conditions in accordance with the present invention.

The phase control valve actuation of intake and exhaust valves to establish low pressure event within the combustion chamber is carried out to establish pressure level depressions and durations thereof within the combustion chamber that are not found in conventional known four-stroke operation. With additional reference now to FIG. 4, a pressure profile corresponding to the exemplary load dependent intake valve profile trend described with respect to FIG. 3 is illustrated. Therein, a curve is generally designated by the numeral 61 and is illustrated with respect to only the 360 degrees of crankshaft rotation through the exhaust and intake strokes of the complete four-stroke process as delineated across the top of the figure within double-ended arrows labeled EXHAUST and INTAKE. Cylinder pressure is illustrated on a linear scale along the vertical axis with ambient pressure being specifically labeled and assumed to be substantially one standard atmosphere or about 101 kPa. Region 63 generally designates the area of resultant low pressure events or sub-atmospheric pressure conditions established in accordance with the present invention. A moderately deep and lasting duration low pressure event reaches substantially 60 kPa below ambient or sub-atmospheric or, alternatively stated, about 60% below ambient or atmospheric or about 40% of ambient or atmospheric. The specific curves illustrated in FIG. 4 are, of course, exemplary with other such curves and profiles being able to be established by virtue of more complex and independent variations of the exhaust and intake profiles including by way of lift variation in addition to timing and duration. For example, relative to the specific curve 77 illustrated in FIG. 3, further retarding the intake valve opening during intake events would effectuate deeper low pressure events whereas further advancing the intake valve opening during intake events would effectuate shallower low pressure events. An exemplary, relatively shallow and limited duration low pressure event reaches substantially 42 kPa below ambient or sub-atmospheric or alternatively stated about 42% below ambient or atmospheric or about 58% of ambient or atmospheric. An exemplary, relatively deep and lasting duration low pressure event reaches substantially 75 kPa below ambient or sub-atmospheric or alternatively stated about 75% below ambient or atmospheric or about 25% of ambient or atmospheric. As previously described with respect to FIG. 3, lower in cylinder pressures are desirably effected at lower engine loads. That is to say, deeper vacuum levels are achieved at lower engine loads. The decreasing load arrow of FIG. 4 illustrates the desired controlled trend of intake pressure profiles as a function of decreasing engine load.

Recirculated exhaust gases are desirably introduced into the combustion chamber for mixing with air and fuel. Presently, with reference once again to the valve schedules exhibited in FIG. 3, an exhaust re-breathe exhaust valve actuation effects re-ingestion of combusted gases previously expelled into the exhaust passage through the exhaust valve. Lift variation allows for variations in gas constituent mixtures and temperatures in this exhaust re-breathe implementation. An exemplary re-breathe schedule is labeled 79 in FIG. 3.

The preferred fueling methodology for an engine operated as set forth herein above will now be described. Liquid and gaseous injections are candidates for DI. Additionally, it is contemplated that air assisted and other types of delivery may be employed. Also, the type of ignition system employable is variable—generally in accordance with engine load and knock considerations—and includes such non-limiting examples as SI, CI, and controlled auto-ignition.

Figure 5:
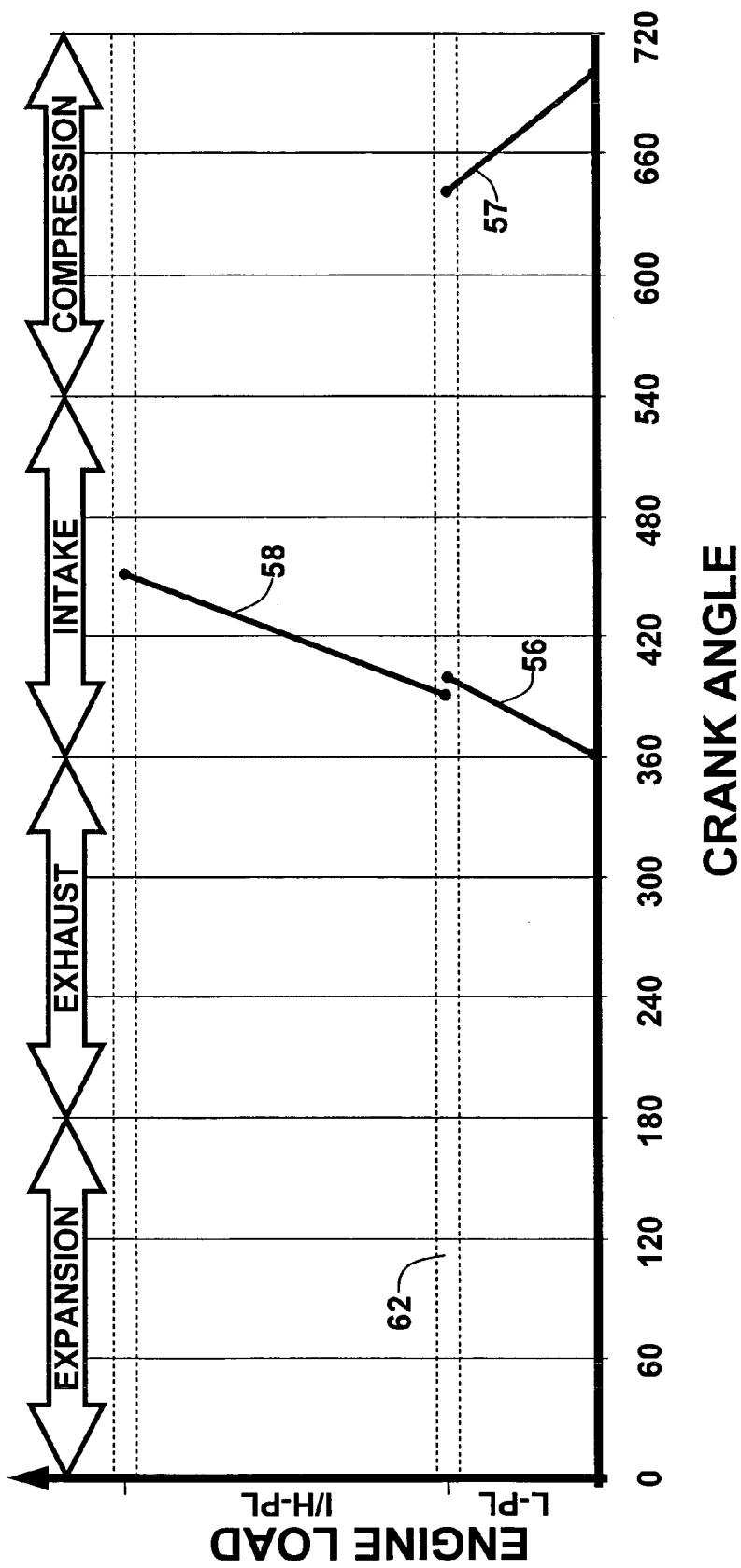
FIG. 5 illustrates part-load operating regions and exemplary fuel injection timing schedules corresponding thereto in accordance with exhaust gas re-breathe aspects of the present invention.

In accordance with the fueling control aspects of the present invention, two general load regions within the part load operating region of the engine are delineated. With reference to FIG. 5, low part load region is labeled L-PL and intermediate/high part load region is labeled I/H-PL. These regions are plotted against a complete four-stroke combustion cycle delineated variously by crank angle ATDC combustion at the bottom and corresponding sequentially repeated combustion cycle regions at the top. Generally, in the low part load region a split-injection of the total fuel charge is caused to occur whereas in the intermediate/high part load region a single-injection of the total fuel charge is caused to occur. There is illustrated in the figure transition region 62 which may significantly overlap one or both of the adjacent part load regions effectively extending the part load regions for corresponding fuel controls.

With the split-injection, the total fuel requirement for the cycle is divided into two injection events. One of the injection events is carried out early in the intake cycle while the other injection event is carried out late in the compression cycle. Generally, the first fueling event injects about 10 to about 50 percent of the total fuel requirement for the cycle. Generally, the cylinder charge established by this first fraction of fuel is insufficient for auto-ignition within the combustion chamber. The remainder of the fuel requirement for the cycle is injected during the second fueling event. This second fraction of fuel enriches the cylinder charge during a compression stroke of the piston sufficient to cause auto-ignition.

Penetration and dispersion of the second fuel spray are suppressed due to higher in-cylinder charge temperature and density. A localized rich mixture region is formed in the combustion chamber. The mixture of air, re-ingested combusted gas, and fuel from first fuel injection works in conjunction with the localized rich mixture formed by the second fuel injection to accomplish the auto-ignition of gasoline under a relatively low compression ratio without any help of spark as compared to a relatively high compression ratio used in the auto-ignition of diesel fuel.

In the high part load operating region (H-PL), a single injection of fuel is performed. With the single-injection, the total fuel requirement for the cycle is consolidated in one injection event carried out early in the intake cycle.

FIG. 5 is also demonstrative of certain preferences regarding injection timing. The region delimited by the solid lines labeled 56 and 57 correspond to preferred angular regions within the intake and compression cycles for delivery of the first fueling event and second fueling event, respectively, for the low part load operating region. Preferably, the first fraction of fuel is injected about 360 to about 400 degrees ATDC combustion. The injection timing for the first injection also preferably retards in a continuous manner as the engine load increases as shown in the figure. And the second fraction of fuel is injected about 640 to about 700 degrees ATDC combustion (20 to 80 degrees before top dead center combustion). This injection timing is chosen to ensure smoke-free operation and is affected by the injector spray cone angle and the amount of fuel injected. The injection timing for the second injection also preferably advances in a continuous manner as the engine load increases. Other angular regions for the split-injection injection may be utilized but may not yield as substantial an advantage as the preferred regions.

The region delimited by the solid line labeled 58 corresponds to a preferred angular region within the intake cycle for delivery of the intake cycle fueling event for the intermediate/high part load operating region. Preferably, this fuel is injected about 390 to about 450 degrees ATDC combustion. The injection timing for the single-injection also preferably retards in a continuous manner as the engine load increases as shown in the figure. Other angular regions for the single-injection may be utilized but may not yield as substantial an advantage as the preferred regions.

Transition from one injection strategy to another during load change is regulated by both engine performance and emissions. For example, during operation with low part load, split-injection with first injection during early intake stroke and second injection during compression stroke is the only injection strategy that is capable of generating stable controlled auto-ignition combustion. The injection timing for the second injection is advanced continuously with increasing engine load to promote dispersion of fuel within the combustion chamber and to keep the air/fuel ratio of the localized mixture within an acceptable range to avoid unacceptable levels of NOx and smoke emissions. However, even with the advanced injection timing, formation of nitrogen oxides (NOx) can still rise to unacceptable level during operation with intermediate part load. Thus, the injection strategy is switched from split-injection to single-injection as shown in FIG. 6 about 90 to about 130 kPa Net Mean Effective Pressure (NMEP). Experiments confirm that both split and single injection strategies result in similar engine performance during intermediate part load engine operation. Comparative NOx emissions are significantly less with single fuel injection during intake stroke than with the split-injection. Comparative hydrocarbon (HC) emissions, however, are greater with single fuel injection during intake stroke due to increases in crevice-trapped fuel that escapes combustion than with the split-injection. Therefore, the exact load where the transition takes place will be determined by NOx-HC emissions tradeoff.

FIG. 6 shows exemplary opening and closing valve timings as a function of engine load for the exhaust and intake valves of a four-stroke internal combustion engine operating in accordance with the present invention using a phase control valve actuation system. Therein, the following labeling is used: intake valve opening (IVO); intake valve closing (IVC); exhaust valve opening—exhaust ($EVO_e$); exhaust valve closing—exhaust ($EVC_e$); exhaust valve opening—re-breathe ($EVO_r$); and, exhaust valve closing—re-breathe ($EVC_r$). Also shown in FIG. 6 are the load dependent injection strategies and various combustion modes as a function of engine load in accordance with the present invention. In particular, the engine is operated in controlled auto-ignition combustion mode with lean air/fuel mixture (CAI-L) below about 420 kPa NMEP. During this combustion mode, the NOx emission index increases with increasing engine load. At about 420 kPa NMEP, the NOx emission index is around 1 g/kg fuel. Between about 420 and about 500 kPa NMEP, the engine is operated in controlled auto-ignition combustion mode with stoichiometric air/fuel ratio (CAI-S) to allow the use of traditional 3-way catalyst after treatment for NOx control. Between about 500 and about 600 kPa NMEP, the engine is operated in spark-ignition, non-throttled combustion mode with stoichiometric air/fuel mixture (NT-S) using early intake valve closing for load control. Beyond about 600 kPa NMEP, the engine is operated in traditional spark-ignition, throttled combustion mode with stoichiometric air/fuel mixture (T-S) until reaching full load.

Additional details respecting combustion gas recirculation valve and fuel controls for controlled auto-ignition—including alternative FFVA implementations—are found in previously incorporated, commonly assigned and co-pending U.S. patent application Ser. Nos. 10/899,442, and 10/899,456 (now U.S. Pat. No. 7,021,277).

In accordance with certain alternative valve control aspects of the present invention, during part load operation of the engine a high pressure event is established within the combustion chamber, preferably by means of FFVA or phase control valve actuation advancing the closure of the exhaust valve and, preferably, retarding the opening of the intake valve. The advance of the exhaust valve closure creates a negative valve overlap during which both of the exhaust and intake valves are closed. The advanced closure of the exhaust valve also effects an internal recirculation of combusted gases by retaining or trapping a portion thereof within the combustion chamber. This trapped exhaust gas is then re-compressed for the remainder of the piston stroke during the exhaust cycle.

Figure 7:
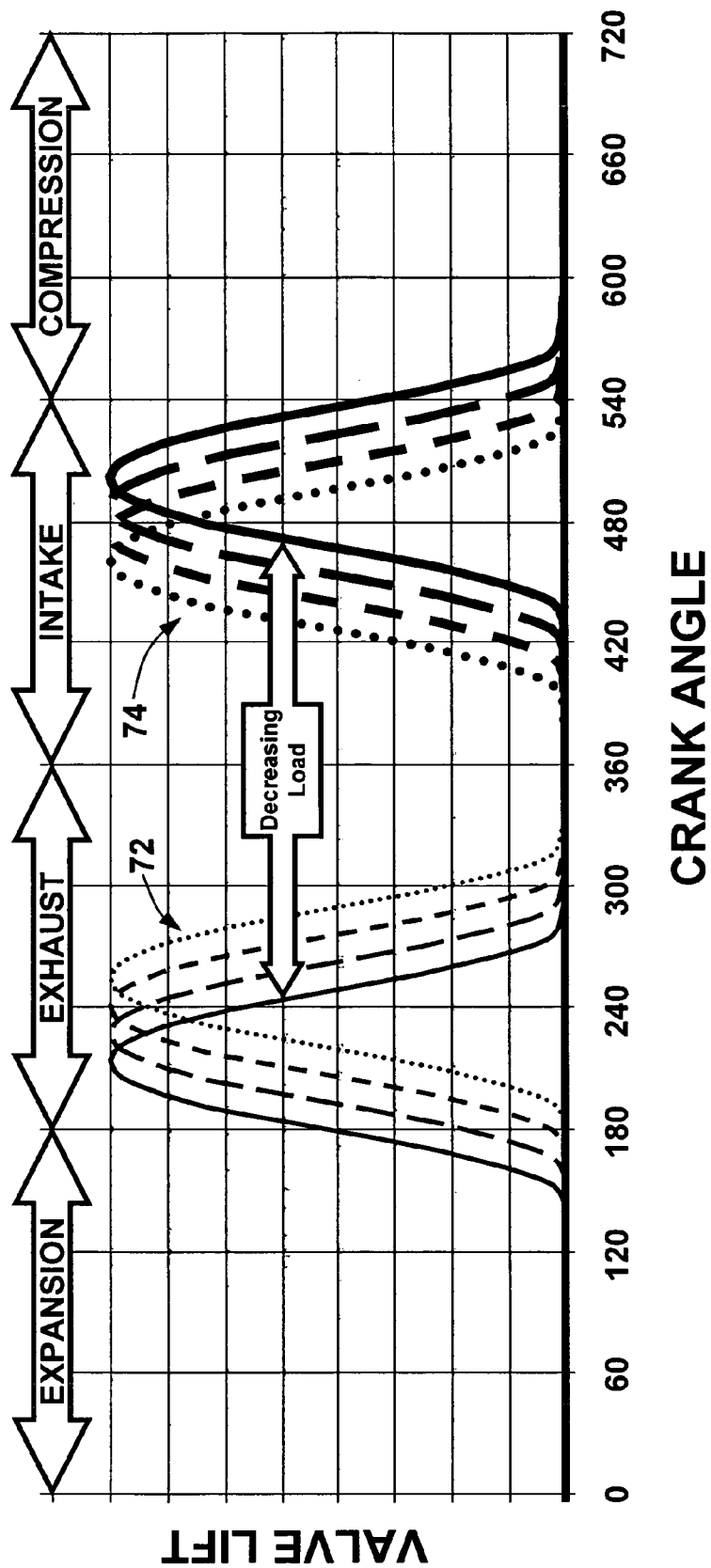
FIG. 7 illustrates various exhaust and intake valve phase and lift versus crank angle curves and preferred trend correspondence to engine load corresponding to the single cylinder engine of FIG. 1 with phase controlled valve actuation for effecting desired in cylinder conditions in accordance with exhaust gas trapping/re-compression aspects of the present invention.
Figure 9:
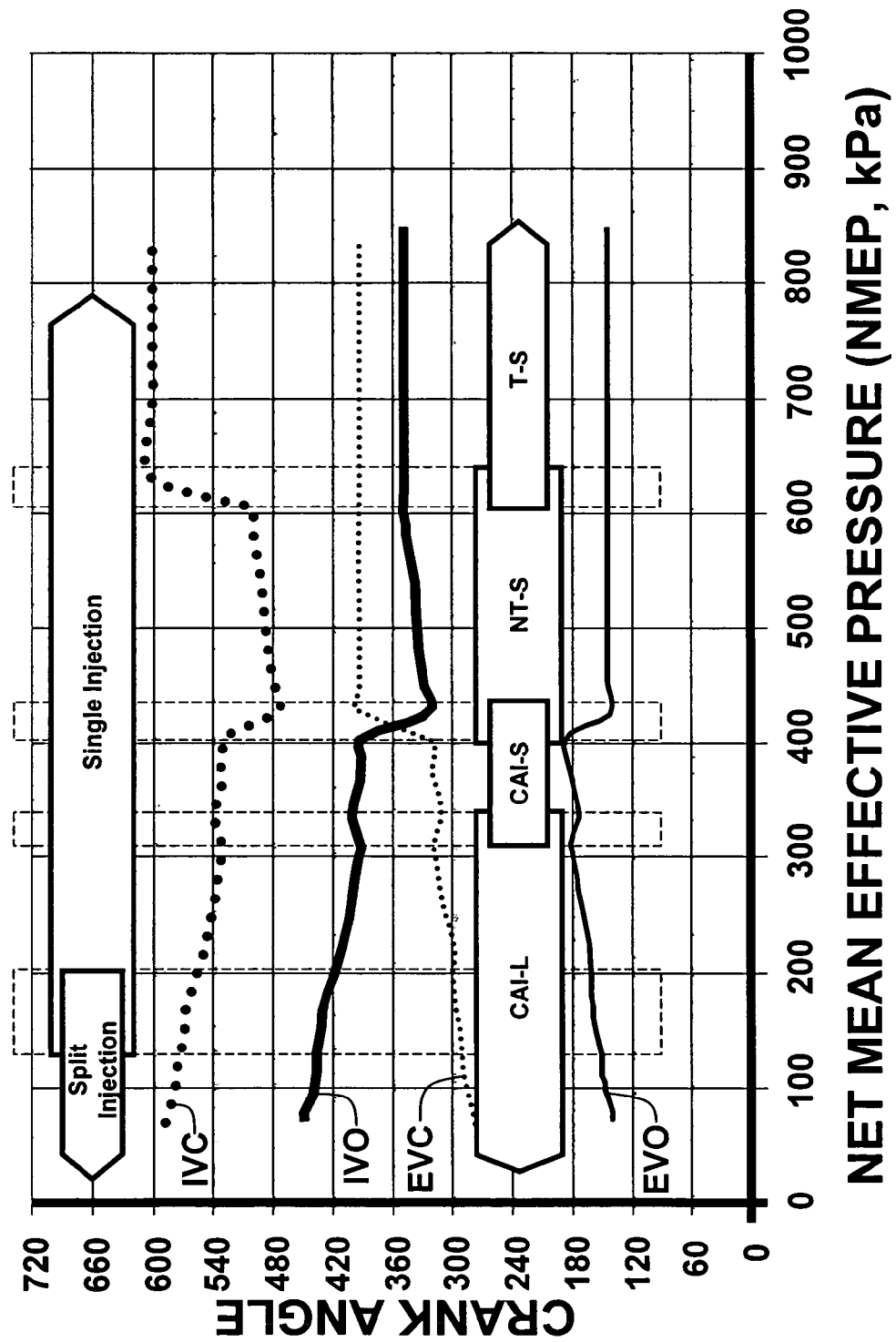
FIG. 9 illustrates exemplary valve timing effected by phase controlled valve actuation, fuel injection strategies and combustion modes versus part load regions of engine operation in accordance with the present invention.

FIGS. 7 and 9 illustrate phase control valve actuation to effect the combusted gas retention and compression aspects of the present invention. Therein, hydraulically controlled valve lift mechanisms together with cam phaser mechanisms, both of well known varieties, provide intake valve and exhaust valve phase shifting to effect the desired combustion chamber conditions in accordance with the present invention. The intake valve schedule is illustrated with an exemplary duration of substantially 125 degrees illustrated in each of the individual curves comprising the intake schedule 74 from more advanced to more retarded phasing as engine load decreases. The exhaust valve schedule is similarly illustrated with an exemplary duration of substantially 125 degrees illustrated in each of the individual curves comprising the exhaust schedule 72 from more retarded to more advanced phasing as engine load decreases.

In the present example illustrated in FIG. 7, it is assumed that an exhaust event is caused to occur wherein the exhaust valve is opened for at least a portion of the exhaust stroke from 180 to 360 degrees. The actual opening and closing angles of the exhaust valve during an exhaust event will vary in accordance with such factors as engine speed or load and exhaust runner geometries as well as other desired engine tuning characteristics. In the present illustrated example the closing timing of the exhaust valve is seen to vary as a function of the engine load as indicated by the decreasing load arrow central in the figure. During part load operation, the lower the engine load goes, the more advanced is the exhaust valve closing timing (and the more advanced is the opening timing as well due to the phaser implementation). Thus, it is generally true that decreasing loads will result in increased combusted gas trapping and higher compression temperature and pressure thereof. The higher pressures and temperatures effected by the valve control provides an in-cylinder environment that is conducive to partial reformation of fuel injected therein, which reformation and subsequent dispersal of reformate within the combustion chamber enables controlled auto-ignition. The desired trending of increases in trapped combusted gases and increases in pressures and temperatures with decreases in engine operating loads provides for optimal auto-ignition combustion phasing throughout the part load region of engine operation. A generally symmetrical and directionally opposite phasing of the intake valve opening timing is effected also as illustrated in each of the individual curves comprising the intake schedule 74. Relaxation of the high pressure within the combustion chamber is effected thereby and returns the stored energy of the compressed gas back to the piston and engine crankshaft. Therefore, the desired trending of increases in trapped combusted gases and increases in pressures and temperatures with decreases in engine operating loads is accomplished with the phase control of the exhaust valve lift mechanism. And, a generally symmetrical and directionally opposite phasing of the intake valve timing is effected also as illustrated in the intake schedule 74 to provide the relaxation benefits described herein above.

The phase control valve actuation of intake and exhaust valves to establish trapped combusted gas and pressure conditions within the combustion chamber are carried out to establish in-cylinder gas, pressure and temperature trends as a function of engine load which are not found in conventional known four-stroke operation.

The preferred fueling methodology for an engine operated as set forth herein above will now be described. Liquid and gaseous injections are candidates for DI. Additionally, it is contemplated that air assisted and other types of delivery may be employed. Also, the type of ignition system employable is variable—generally in accordance with engine load and knock considerations—and includes such non-limiting examples as SI, CI, and controlled auto-ignition.

Figure 8:
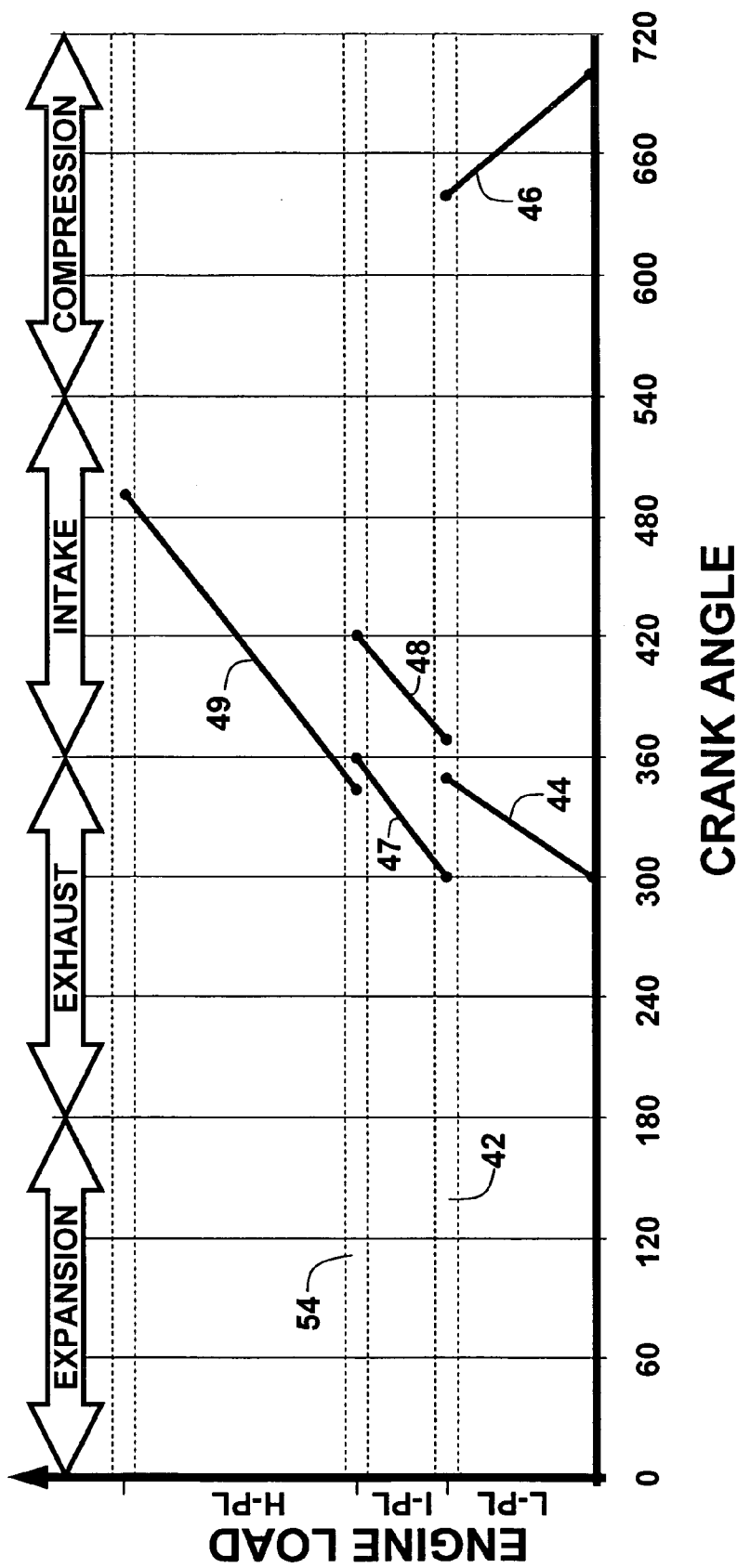
FIG. 8 illustrates part-load operating regions and exemplary fuel injection timing schedules corresponding thereto in accordance with exhaust gas trapping/re-compression aspects of the present invention.

In accordance with the fueling control aspects of the present invention, three general load regions within the part load operating region of the engine are delineated. With reference to FIG. 8, low part load region is labeled L-PL, intermediate part load region is labeled I-PL and high part load region is labeled H-PL. These regions are plotted against a complete four-stroke combustion cycle delineated variously by crank angle ATDC combustion at the bottom and corresponding sequentially repeated combustion cycle regions at the top. Generally, in the low and intermediate part load regions, split-injection of the total fuel charge is caused to occur whereas in the high part load region a single-injection of the total fuel charge is caused to occur. There are illustrated in the figure transition regions 42 and 54 which may significantly overlap one or both respectively adjacent part load regions effectively extending part load regions for corresponding fuel controls.

With split-injection, the total fuel requirement for the cycle is divided into two injection events. In the low part load operating region (L-PL), one of the injection events is carried out late in the exhaust cycle while the other injection event is carried out late in the compression cycle. Generally, the first fueling event injects about 10 to about 50 percent of the total fuel requirement for the cycle. Generally, the cylinder charge established by this first fraction of fuel is insufficient for auto-ignition within the combustion chamber. The remainder of the fuel requirement for the cycle is injected during the second fueling event. This second fraction of fuel enriches the cylinder charge during a compression stroke of the piston sufficient to cause auto-ignition at low part loads.

Penetration and dispersion of the second fuel spray are suppressed due to higher in-cylinder charge temperature and density. A localized rich mixture region is formed in the combustion chamber. The mixture of air, trapped combusted gas, and fuel from first fuel injection works in conjunction with the localized rich mixture formed by the second fuel injection to accomplish the auto-ignition of gasoline under a relatively low compression ratio without any help of spark as compared to a relatively high compression ratio used in the auto-ignition of diesel fuel.

In the intermediate part load operating region (I-PL), one of the injection events is similarly carried out late in the exhaust cycle. However, the other injection event is carried out early in the intake cycle. Generally, the first fueling event injects about 10 to about 50 percent of the total fuel requirement for the cycle. Generally, the cylinder charge established by this first fraction of fuel is insufficient for auto-ignition within the combustion chamber but provides the seed charge of fuel and reformate critical to auto-ignition. The remainder of the fuel requirement for the cycle is injected during the second fueling event. This second fraction of fuel enriches the cylinder charge during the intake stroke of the piston sufficient to cause auto-ignition at intermediate part loads.

Penetration and dispersion of the second fuel spray are initially suppressed due to higher in-cylinder charge temperature, density and first injected fuel. However, the relaxing in-cylinder pressure and subsequent fresh air ingestion and turbulence during the intake cycle provide conditions for substantial dispersal and homogeneity of the cylinder mixture. This homogeneous mixture of air, retained combusted gas, and fuel work in conjunction to accomplish the auto-ignition of gasoline under a relatively low compression ratio without any help of spark as compared to a relatively high compression ratio used in the auto-ignition of diesel fuel.

In the high part load operating region (H-PL), a single injection of fuel is performed. With the single-injection, the total fuel requirement for the cycle is consolidated in one injection event carried out during the negative valve overlap.

FIG. 8 is also demonstrative of certain preferences regarding injection timing. The region delimited by the solid lines labeled 44 and 46 correspond to preferred angular regions within the exhaust and compression cycles for delivery of the first fueling event and second fueling event, respectively, for the low part load operating region. Preferably, the first fraction of fuel is injected about 300 to about 350 degrees ATDC combustion. The injection timing for the first injection also preferably retards in a continuous manner as the engine load increases as shown in the figure. And the second fraction of fuel is injected about 640 to about 695 degrees ATDC combustion (25 to 80 degrees before top dead center combustion). This injection timing is chosen to ensure smoke-free operation and is affected by the injector spray cone angle and the amount of fuel injected. The injection timing for the second injection also preferably advances in a continuous manner as the engine load increases. Other angular regions for the split-injection injection may be utilized but may not yield as substantial an advantage as the preferred regions.

The region delimited by the solid lines labeled 47 and 48 correspond to preferred angular regions within the exhaust and intake cycles for delivery of the first fueling event and second fueling event, respectively, for the intermediate part load operating region. Preferably, the first fraction of fuel is injected about 300 to about 360 degrees ATDC combustion. The injection timing for the first injection also preferably retards in a continuous manner as the engine load increases as shown in the figure. This injection timing is chosen to ensure smoke-free operation (e.g. avoidance of fuel spray on rising piston), provide sufficient fuel quantity and resident time for adequate reformation, and is affected by the injector spray cone angle and the amount of fuel injected. The second fraction of fuel is injected about 30 to about 60 degrees after the end of the first injection. The injection timing for the second injection also preferably retards in a continuous manner as the engine load increases. Both intermediate injections are accomplished within the negative overlap region of the exhaust and intake valves. Other angular regions for the split-injection injection may be utilized but may not yield as substantial an advantage as the preferred regions.

The region delimited by the solid line labeled 49 corresponds to a preferred angular region for delivery of the fuel for the high part load operating region. Preferably, this fuel is injected about 340 to about 490 degrees ATDC combustion. The injection timing for the single-injection also preferably retards in a continuous manner as the engine load increases as shown in the figure. Other angular regions for the single-injection may be utilized but may not yield as substantial an advantage as the preferred regions.

Transition from one injection strategy to another during load change is regulated by both engine performance and emissions. For example, during operation with low part load, split-injection with first injection during the negative valve overlap period and second injection during compression stroke is the only injection strategy capable of generating stable controlled auto-ignition combustion. The injection timing for the second injection is advanced continuously with increasing engine load to promote dispersion of fuel within the combustion chamber and to keep the air/fuel ratio of the localized mixture within an acceptable range to avoid unacceptable levels of NOx and smoke emissions. However, even with the advanced injection timing, formation of nitrogen oxides (NOx) can still rise to unacceptable level during operation with intermediate part load. Thus, the injection strategy is switched from split-injection with second compression cycle injection to split-injection with second intake cycle injection as shown in FIG. 9 about 130 to about 200 kPa NMEP. Experiments confirm that both split-injection strategies result in similar engine performance during intermediate part load engine operation. Comparative NOx emissions may be significantly less with split-injections using a second injection during the intake stroke than with split-injections using a second injection during the compression stroke. Comparative hydrocarbon (HC) emissions, however, are greater with split-injections using a second injection during the intake stroke due to increases in crevice-trapped fuel that escapes combustion than with split-injections using a second injection during the compression stroke. Therefore, the exact load where the low part load split-injection and intermediate load split-injection transition takes place will be determined by NOx-HC emissions tradeoff. Similar considerations define criteria used to establish transition from the intermediate part load split-injection strategy to the high part load single-injection strategy (e.g. NOx-HC emissions tradeoff).

FIG. 9 shows exemplary opening and closing valve timings as a function of engine load for the exhaust and intake valves of a four-stroke internal combustion engine operating in accordance with the present invention to effect exhaust gas re-compression using 2-step/phaser variable valve actuation hardware. Therein, the following labeling is used: intake valve opening (IVO); intake valve closing (IVC); exhaust valve opening (EVO); exhaust valve closing (EVC). Also shown in FIG. 9 are the load dependent injection strategies and various combustion modes as a function of engine load in accordance with the present invention. In particular, the engine is operated in controlled auto-ignition combustion mode with lean air/fuel mixture (CAI-L) below about 320 kPa NMEP. During this combustion mode, the NOx emission index increases with increasing engine load. At about 320 kPa NMEP, the NOx emission index is around 1 g/kg fuel. Between about 320 and about 420 kPa NMEP, the engine is operated in controlled auto-ignition combustion mode with stoichiometric air/fuel ratio (CAI-S) to allow the use of traditional 3-way catalyst after treatment for NOx control. Between about 420 and about 620 kPa NMEP, the engine is operated in spark-ignition, non-throttled combustion mode with stoichiometric air/fuel mixture (NT-S) using early intake valve closing for load control. Beyond about 620 kPa NMEP, the engine is operated in traditional spark-ignition, throttled combustion mode with stoichiometric air/fuel mixture (T-S) until reaching full load.

Additional details respecting combustion gas trapping and re-compression valve and fuel controls for controlled auto-ignition—including alternative FFVA implementations—axe found in commonly assigned and co-pending U.S. patent application Ser. No. 10/899,457 (now U.S. Pat. No. 7,128,047), the contents of which are incorporated herein by reference, and previously incorporated, commonly assigned and co-pending U.S. patent application Ser. No. 10/899,456 (now U.S. Pat. No. 7,021,277).

The exhaust gas recirculation described herein above has been with respect to non-limiting examples of exhaust valve based re-breathe of combusted gases and trapping/re-compression of combusted gases using multi-step lift and cam phaser valve actuations. Alternative valve actuation implementations for such re-breathe and/or trapping/re-compression, for example FFVA as disclosed in previously incorporated, commonly assigned and co-pending U.S. patent application Ser. No. 10/899,457 (now U.S. Pat. No. 7,128,047); Ser. No. 10/611,845 (now U.S. Pat. No. 7,004,124); Ser. No. 10/611,366 (now U.S. Pat. No. 6,983,732); Ser. Nos. 10/899,442,; 10/899,443 and, 110/899,456 (now U.S. Pat. No. 7,021,277), are equally applicable for effecting the desired combustion chamber conditions. In accordance with an alternative re-breathe implementation for exhaust gas recirculation, the intake valve is opened during at least a portion of the exhaust event to expel combusted gases into the intake passage 17 for subsequent recirculation or re-breathe thereof by drawing them back into the combustion chamber vis-à-vis the intake valve. Re-breathe intake valve actuations may be effected by FFVA or multi-step lift and cam phaser implementations. Additional details of such intake valve based exhaust gas re-breathing in conjunction with establishment of low combustion chamber pressures is disclosed in previously incorporated, commonly assigned and co-pending U.S. Ser. No. 10/899,443. Additionally, external exhaust gas recirculation apparatus may be employed. For example, conventional exhaust gas recirculation valves may provide adequate combusted gases to anintake passage of the engine where adequate intake vacuum is present for forced ingestion. Alternatively, where sufficient vacuum is not present in an intake passage—such as is the case with non-throttled modes of operation typical in controlled auto-ignition systems—an exhaust gas recirculation pump may provide positive pressure feeding of combusted gases to the intake.

Figure 10:
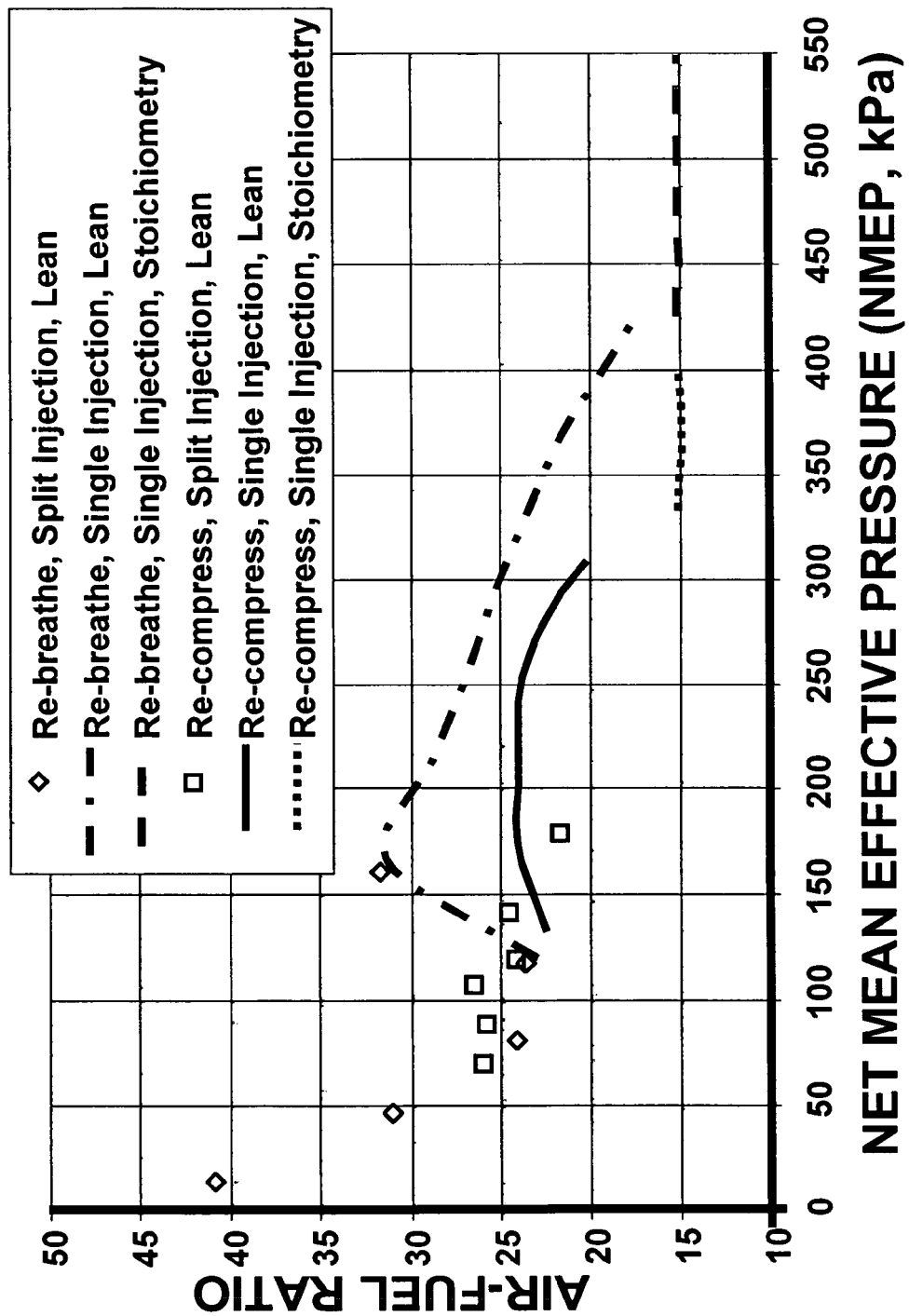
FIG. 10 comparatively illustrates exemplary air-fuel ratio versus cylinder net mean effective pressure curves for various combinations of exhaust gas re-breathing, re-compression and fueling controls in accordance with the present invention.
Figure 11:
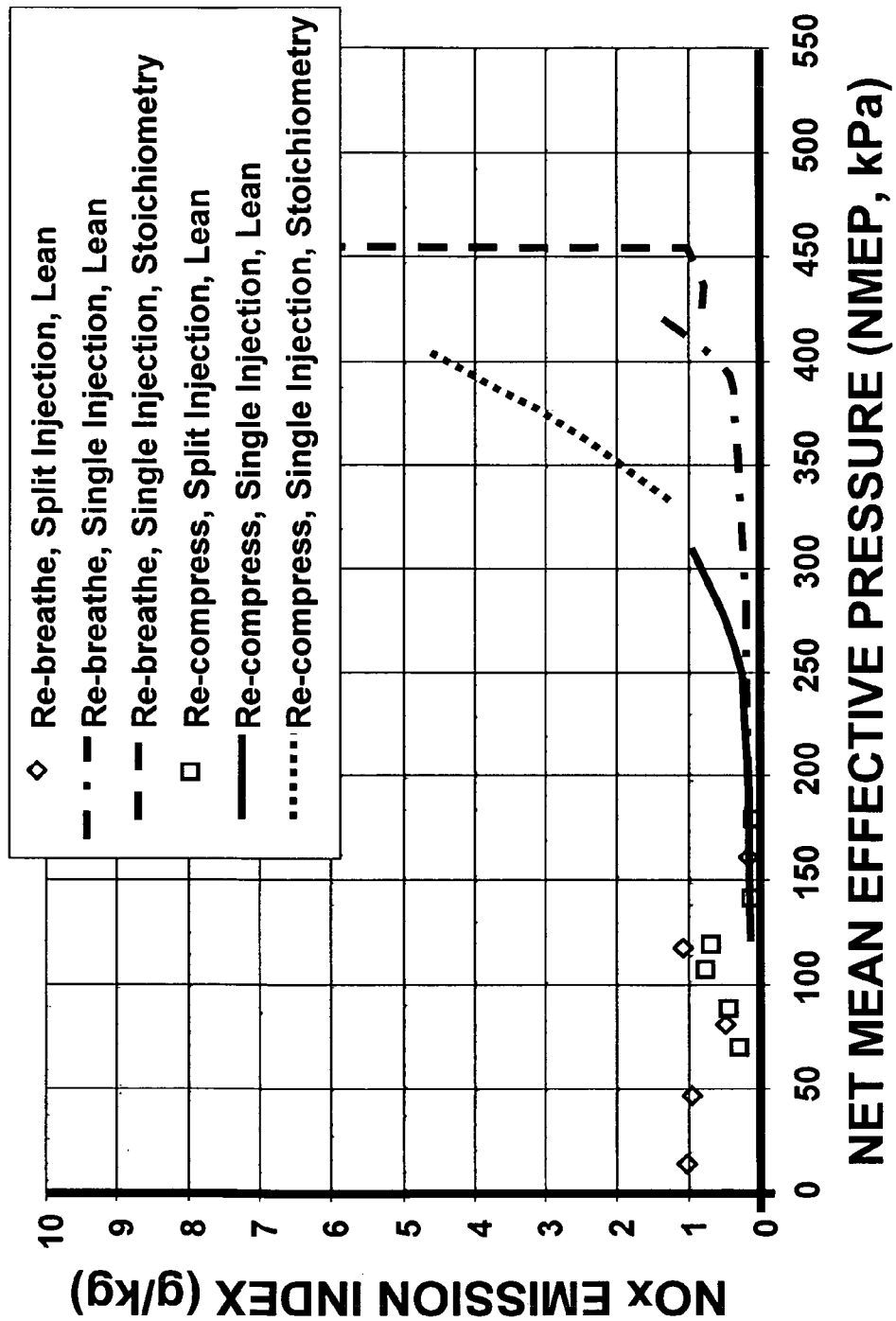
FIG. 11 comparatively illustrates resultant NOx emissions versus cylinder net mean effective pressure curves for the various exemplary combinations of exhaust gas re-breathing, re-compression and fueling controls of FIG. 10 in accordance with the present invention.
Figure 12:
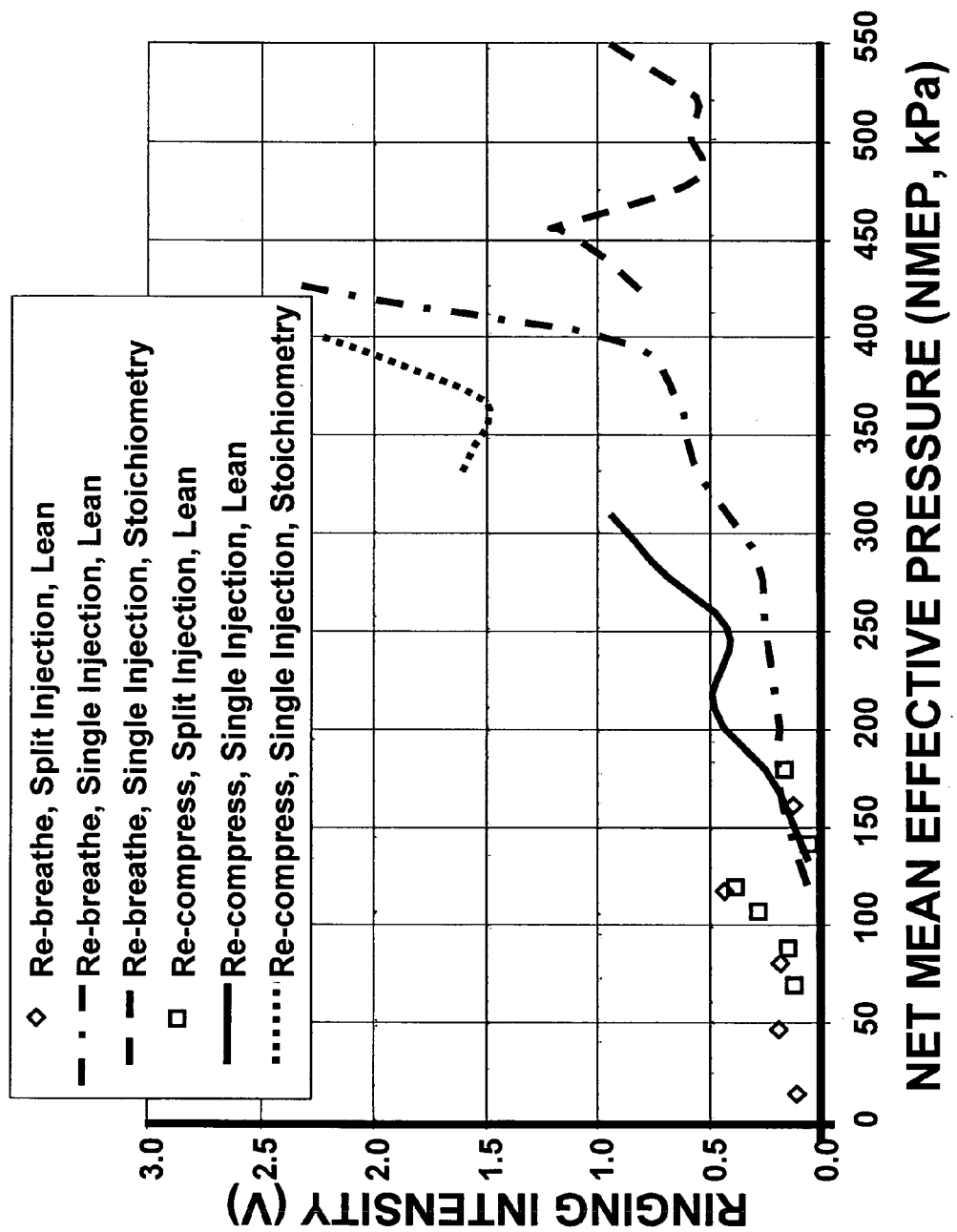
FIG. 12 comparatively illustrates resultant engine knock versus cylinder net mean effective pressure curves for the various exemplary combinations of exhaust gas re-breathing, re-compression and fueling controls of FIG. 10 in accordance with the present invention.

With reference now to FIG. 10, exemplary air-fuel schedules are illustrated for a variety of combinations of the exhaust re-breathing and re-compression strategies, split and single injection strategies and lean and stoichiometric air-fuel ratio strategies in accordance with the present invention. The re-breathing related strategies correspond substantially to the prior descriptions herein related to FIGS. 3–6. And, the re-compression related strategies correspond substantially to the prior descriptions herein related to FIGS. 7–9. The air-fuel schedules of FIG. 10 correspond substantially to experimentally determined data using the exemplary single cylinder engine as previously set forth herein and effecting stable part load engine operation down to at least about 75 kPa NMEP in either of the employed re-breathe or re-compression strategies. Stable part load is measured by generally accepted metrics such as 5% or less Coefficient of Variation of Indicated Mean Effective Pressure (COV of IMEP) as an indicator. Even lower stable part load operation is attainable with valve controls alternative to those specifically described for illustration herein, the low load limit not being particularly critical to the implementation or understanding of the present invention. From FIG. 10 it can be observed for re-breathing valve control strategies that lean air-fuel ratios are effected at the lowest part loads through about 425 kPa NMEP, whereafter substantially stoichiometric air-fuel ratios are effected. Similarly, it can be observed for re-compression valve control strategies that lean air-fuel ratios are effected at the lowest part loads through about 320 kPa NMEP, whereafter substantially stoichiometric air-fuel ratios are effected. The engine loads chosen for transition correspond substantially to an emission target of NOx and is more fully discussed herein below with respect to FIG. 11. Correlation of various engine operating parameters such as fueling rate or throttle request to engine load corresponding to a NOx target can be made and utilized in one implementation of an air-fuel ratio transition in accordance with the present invention and as further detailed herein below with respect to FIG. 13. While such implementation is relatively straightforward, it does require extensive engine mapping for calibrations which may become less accurate over the engine operational life. Such engine parameter calibration table implementation may therefore find additional benefit from adaptive adjustments to calibration data over the engine operational life.

As previously mentioned, combustion stability is readily maintained above some low part load limit. The lean/stoichiometric air-fuel ratio control transition is well above such low load limit and is effectively unaffected by combustion stability considerations. The preferred transition is, however, substantially related to emission considerations—particularly increases in NOx emissions at higher part load engine operation. Therefore, additional reference is made to FIG. 11 wherein normalized NOx emissions (NOx emission index) as measured in grams per kilogram (g/kg) of fuel is plotted against engine load as measured by NMEP in kPa. Transition between lean and stoichiometric air-fuel ratio is, for purposes of alternative control implementations, directly correlated to the NOx emission index. Any arbitrary index value may be chosen for transitions; however, an index value of substantially 1 g/kg is a preferred value below which NOx emissions are presently deemed acceptable and above which NOx emissions are presently deemed unacceptable. A direct measurement of NOx emissions therefore provides a most accurate and repeatable transition control which self-adapts to emission changes which-may occur over the engine operational life. Direct measurement of NOx emissions therefore can be made and utilized in another implementation of an air-fuel ratio transition in accordance with the present invention and as further detailed herein below with respect to FIG. 14. While direct NOx sensing technologies are generally available (e.g. thick film zirconia-based sensors), such exhaust gas constituent sensing presently has limited production penetration and commercial experience.

Another alternative air-fuel ratio transition control implementation utilizes a correlation between more widely and conventionally employed sensing technology and NOx emissions. For example, commonly employed knock sensor output (ringing intensity) as measured in volts (V) is plotted against engine load as measured by NMEP in kPa. It has been experimentally determined that a substantial correlation exists between knock intensity and NOx emissions. Therefore, correlation of knock intensity to NOx index can be made and utilized in yet another implementation of an air-fuel ratio transition in accordance with the present invention and as further detailed herein below with respect to FIG. 15. Such implementation is beneficial since knock sensing is generally well understood with substantial production penetration and commercial experience and availability. Also, such correlation does not require an extensive calibration mapping nor would its accuracy require adaptive measures over the engine operational life. Therefore, a look-up table may provide sufficient correlation data mapping knock intensity to NOx emissions for use in another implementation of an air-fuel ratio transition.

Figure 13:
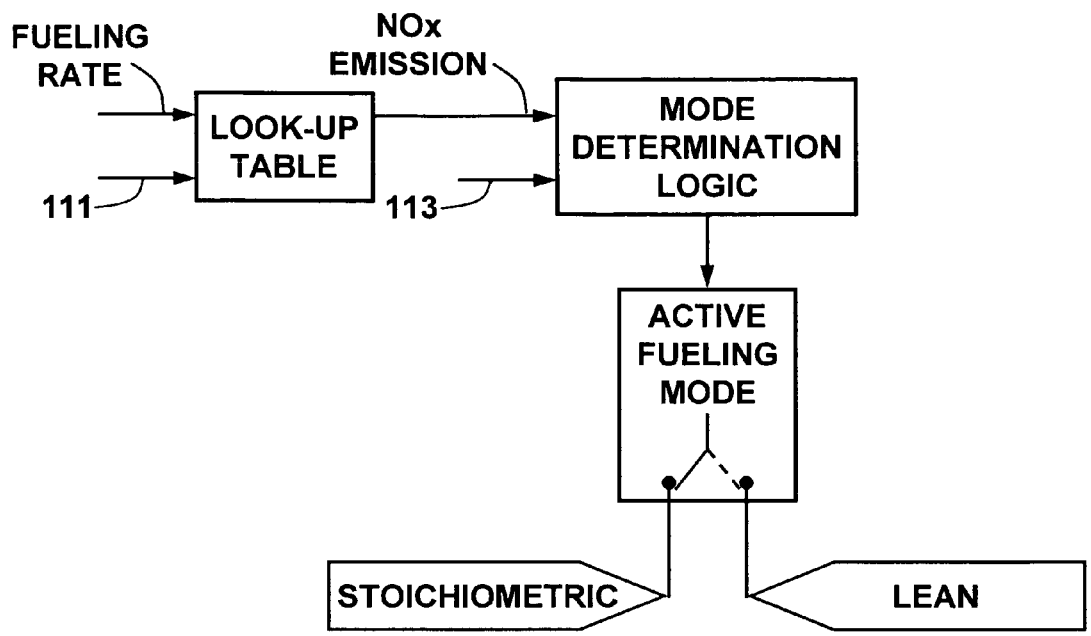
FIG. 13 is a block schematic air-fuel ratio transition determination in accordance with one embodiment of the present invention.
Figure 14:
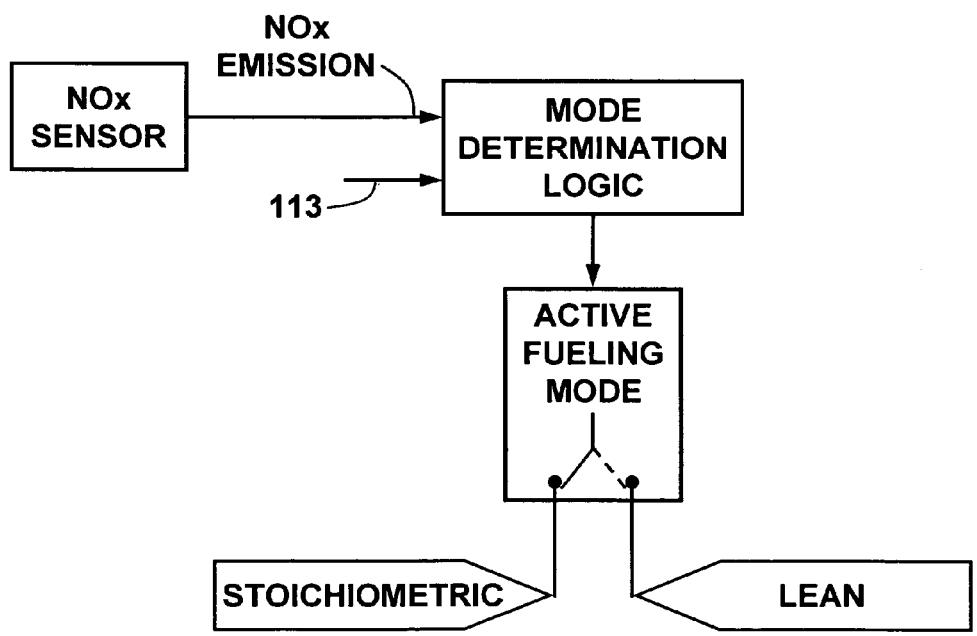
FIG. 14 is a block schematic air-fuel ratio transition determination in accordance with one alternative embodiment of the present invention.
Figure 15:
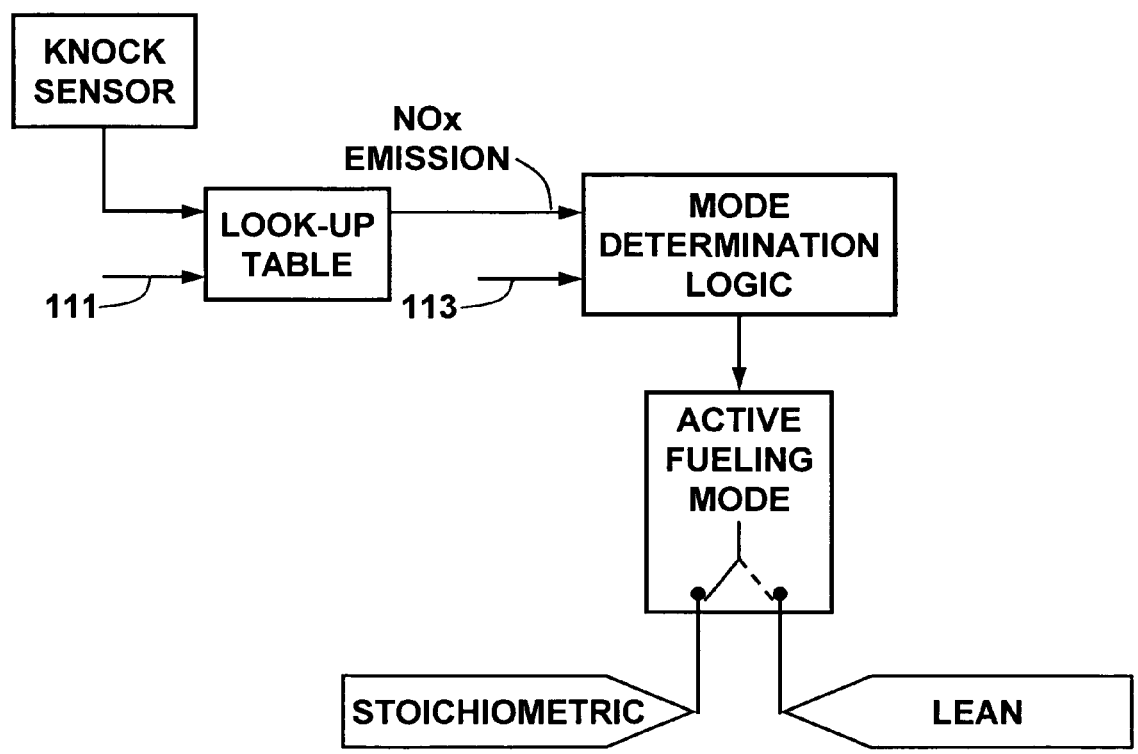
FIG. 15 is a block schematic air-fuel ratio transition determination in accordance with another alternative embodiment of the present invention.

The various alternative embodiments of air-fuel ratio transition set forth above are illustrated in the schematic illustrations of FIGS. 13–15. FIG. 13 illustrates a look-up table based approach wherein fueling rate is utilized to determine a NOx emission index therefrom. Fueling rate may be determined from a control parameter such as a fuel pulse width signal or from requested throttle or other load indicative measure. Accuracy may be improved at the expense of larger calibration data sets by correlating additional parameters 111, for example engine RPM, to NOx emission data also. Mode determination logic block relies on the provided NOx emission index value from the look-up table in the determination of the active fueling mode (i.e. lean or stoichiometric). Mode determination logic may be further influenced and determined by other parameters 113 such as engine RPM. Preferably, the mode determination logic and active fueling mode switching employs routine hysteresis to effect mode switching stability.

FIG. 14 illustrates a direct NOx sensing based approach wherein NOx emission index is determined from an exhaust gas constituent sensor disposed within the exhaust gas stream. Mode determination logic block relies on the provided NOx emission index value from the sensor in the determination of the active fueling mode (i.e. lean or stoichiometric). Mode determination logic may be further influenced and determined by other parameters 113 such as engine RPM. Preferably, the mode determination logic and active fueling mode switching employs routine hysteresis to effect mode switching stability.

FIG. 15 illustrates an indirect NOx sensing based approach wherein NOx emission index is determined from a look-up table based correlation of knock sensor output to NOx emission index. Accuracy may be improved at the expense of larger calibration data sets by correlating additional parameters 111, for example engine RPM, to NOx emission data also. Mode determination logic block relies on the provided NOx emission index value from the look-up table in the determination of the active fueling mode (i.e. lean or stoichiometric). Mode determination logic may be further influenced and determined by other parameters 113 such as engine RPM. Preferably, the mode determination logic and active fueling mode switching employs routine hysteresis to effect mode switching stability.

The present invention has been described with respect to certain preferred embodiments and variations herein. Other alternative embodiments, variations ad implementations may be implemented and practiced without departing from the scope of the invention which is to be limited only by the claims as follow:

The invention claimed is:

1. Method of controlling a four-stroke internal combustion engine being operated in a controlled auto-ignition mode, said engine including a variable volume combustion chamber defined by a piston reciprocating within a cylinder between top-dead center and bottom-dead center points, intake and exhaust passages, a fuel deliver system and intake and exhaust valves controlled during repetitive, sequential exhaust, intake, compression and expansion strokes of said piston comprising:
   operating a variable valve system to control the intake and exhaust valves to effect in-cylinder conditions conducive to controlled auto-ignition;
   operating the fuel delivery system to effect an in-cylinder fuel charge at one of stoichiometric and lean of stoichiometric air-fuel ratios conducive to controlled auto-ignition;
   providing a measure of engine NOx emission index; and,
   when engine NOx emission index crosses a predetermined threshold, transitioning the in-cylinder fuel charge from the operative one of the stoichiometric and lean of stoichiometric air-fuel ratios to the inoperative one of the stoichiometric and lean of stoichiometric air-fuel ratios.

2. The method of controlling a four-stroke internal combustion engine as claimed in claim 1 wherein operating the variable valve system to control the intake and exhaust valves to effect in-cylinder conditions conducive to controlled auto-ignition comprises:
   providing an exhaust event during which the exhaust valve is open for expelling combusted gases from the combustion chamber;
   subsequent to the exhaust event, providing a period of simultaneous closure of the exhaust and intake valves during at least a portion of the intake stroke of the piston effective to establish a sub-atmospheric pressure condition within the combustion chamber; and,
   providing an intake event during which the intake valve is open for ingesting fresh air into the combustion chamber.

3. The method of controlling a four-stroke internal combustion engine as claimed in claim 2 further comprising establishing recirculated exhaust gases within the combustion chamber during intake strokes.

4. The method of controlling a four-stroke internal combustion engine as claimed in claim 3 wherein establishing recirculated exhaust gases comprises internal exhaust gas recirculation.

5. The method of controlling a four-stroke internal combustion engine as claimed in claim 4 wherein internal exhaust gas recirculation comprises trapping exhaust gases within the combustion chamber through early exhaust valve closing.

6. The method of controlling a four-stroke internal combustion engine as claimed in claim 4 wherein internal exhaust gas recirculation comprises re-breathing into the combustion chamber through the exhaust valve opened during the intake stroke exhaust gases expelled into the exhaust passage through the exhaust valve opened during the exhaust stroke.

7. The method of controlling a four-stroke internal combustion engine as claimed in claim 4 wherein internal exhaust gas recirculation comprises re-breathing into the combustion chamber through the intake valve opened during the intake stroke exhaust gases expelled into the intake passage through the intake valve opened during the exhaust stroke.

8. The method of controlling a four-stroke internal combustion engine as claimed in claim 3 wherein establishing recirculated exhaust gases comprises external exhaust gas recirculation.

9. The method of controlling a four-stroke internal combustion engine as claimed in claim 1 wherein operating the variable valve system to control the intake and exhaust valves to effect in-cylinder conditions conducive to controlled auto-ignition comprises:
   providing exhaust events during which the exhaust valve is open for at least a portion of the exhaust stroke for expelling combusted gases from the combustion chamber;
   subsequent to the exhaust events during part load engine operation, providing simultaneous closure of the exhaust and intake valves for a period including a terminal portion of the exhaust strokes effective to trap and compress a portion of combusted gases within the combustion chamber, characterized by higher combustion chamber pressures at lower engine loads; and,
   providing intake events during which the intake valve is open for at least a portion of the intake stroke for ingesting fresh air into the combustion chamber.

10. The method of controlling a four-stroke internal combustion engine as claimed in claim 1 wherein the measure of NOx emission index is provided by a look-up table correlating fueling rate to the measure of NOx emission index.

11. The method of controlling a four-stroke internal combustion engine as claimed in claim 1 wherein the measure of NOx emission index is provided by a NOx sensor.

12. The method of controlling a four-stroke internal combustion engine as claimed in claim 1 wherein the measure of NOx emission index is provided by a look-up table correlating engine knock to the measure of NOx emission index.

13. The method of controlling a four-stroke internal combustion engine as claimed in claim 10 wherein operating the variable valve system to control the intake and exhaust valves to effect in-cylinder conditions conducive to controlled auto-ignition comprises:
   providing an exhaust event during which the exhaust valve is open for expelling combusted gases from the combustion chamber;
   subsequent to the exhaust event, providing a period of simultaneous closure of the exhaust and intake valves during at least a portion of the intake stroke of the piston effective to establish a sub-atmospheric pressure condition within the combustion chamber; and,
   providing an intake event during which the intake valve is open for ingesting fresh air into the combustion chamber.

14. The method of controlling a four-stroke internal combustion engine as claimed in claim 13 further comprising establishing recirculated exhaust gases within the combustion chamber during intake strokes.

15. The method of controlling a four-stroke internal combustion engine as claimed in claim 14 wherein establishing recirculated exhaust gases comprises internal exhaust gas recirculation.

16. The method of controlling a four-stroke internal combustion engine as claimed in claim 15 wherein internal exhaust gas recirculation comprises trapping exhaust gases within the combustion chamber through early exhaust valve closing.

17. The method of controlling a four-stroke internal combustion engine as claimed in claim 15 wherein internal exhaust gas recirculation comprises re-breathing into the combustion chamber through the exhaust valve opened during the intake stroke exhaust gases expelled into the exhaust passage through the exhaust valve opened during the exhaust stroke.

18. The method of controlling a four-stroke internal combustion engine as claimed in claim 15 wherein internal exhaust gas recirculation comprises re-breathing into the combustion chamber through the intake valve opened during the intake stroke exhaust gases expelled into the intake passage through the intake valve opened during the exhaust stroke.

19. The method of controlling a four-stroke internal combustion engine as claimed in claim 14 wherein establishing recirculated exhaust gases comprises external exhaust gas recirculation.

20. The method of controlling a four-stroke internal combustion engine as claimed in claim 10 wherein operating the variable valve system to control the intake and exhaust valves to effect in-cylinder conditions conducive to controlled auto-ignition comprises:
   providing exhaust events during which the exhaust valve is open for at least a portion of the exhaust stroke for expelling combusted gases from the combustion chamber;
   subsequent to the exhaust events during part load engine operation, providing simultaneous closure of the exhaust and intake valves for a period including a terminal portion of the exhaust strokes effective to trap and compress a portion of combusted gases within the combustion chamber, characterized by higher combustion chamber pressures at lower engine loads; and,
   providing intake events during which the intake valve is open for at least a portion of the intake stroke for ingesting fresh air into the combustion chamber.

21. The method of controlling a four-stroke internal combustion engine as claimed in claim 11 wherein operating the variable valve system to control the intake and exhaust valves to effect in-cylinder conditions conducive to controlled auto-ignition comprises:
   providing an exhaust event during which the exhaust valve is open for expelling combusted gases from the combustion chamber;
   subsequent to the exhaust event, providing a period of simultaneous closure of the exhaust and intake valves during at least a portion of the intake stroke of the piston effective to establish a sub-atmospheric pressure condition within the combustion chamber; and,
   providing an intake event during which the intake valve is open for ingesting fresh air into the combustion chamber.

22. The method of controlling a four-stroke internal combustion engine as claimed in claim 21 further comprising establishing recirculated exhaust gases within the combustion chamber during intake strokes.

23. The method of controlling a four-stroke internal combustion engine as claimed in claim 22 wherein establishing recirculated exhaust gases comprises internal exhaust gas recirculation.

24. The method of controlling a four-stroke internal combustion engine as claimed in claim 23 wherein internal exhaust gas recirculation comprises trapping exhaust gases within the combustion chamber through early exhaust valve closing.

25. The method of controlling a four-stroke internal combustion engine as claimed in claim 23 wherein internal exhaust gas recirculation comprises re-breathing into the combustion chamber through the exhaust valve opened during the intake stroke exhaust gases expelled into the exhaust passage through the exhaust valve opened during the exhaust stroke.

26. The method of controlling a four-stroke internal combustion engine as claimed in claim 23 wherein internal exhaust gas recirculation comprises re-breathing into the combustion chamber through the intake valve opened during the intake stroke exhaust gases expelled into the intake passage through the intake valve opened during the exhaust stroke.

27. The method of controlling a four-stroke internal combustion engine as claimed in claim 22 wherein establishing recirculated exhaust gases comprises external exhaust gas recirculation.

28. The method of controlling a four-stroke internal combustion engine as claimed in claim 11 wherein operating the variable valve system to control the intake and exhaust valves to effect in-cylinder conditions conducive to controlled auto-ignition comprises:
   providing exhaust events during which the exhaust valve is open for at least a portion of the exhaust stroke for expelling combusted gases from the combustion chamber;
   subsequent to the exhaust events during part load engine operation, providing simultaneous closure of the exhaust and intake valves for a period including a terminal portion of the exhaust strokes effective to trap and compress a portion of combusted gases within the combustion chamber, characterized by higher combustion chamber pressures at lower engine loads; and,
   providing intake events during which the intake valve is open for at least a portion of the intake stroke for ingesting fresh air into the combustion chamber.

29. The method of controlling a four-stroke internal combustion engine as claimed in claim 12 wherein operating the variable valve system to control the intake and exhaust valves to effect in-cylinder conditions conducive to controlled auto-ignition comprises:
   providing an exhaust event during which the exhaust valve is open for expelling combusted gases from the combustion chamber;
   subsequent to the exhaust event, providing a period of simultaneous closure of the exhaust and intake valves during at least a portion of the intake stroke of the piston effective to establish a sub-atmospheric pressure condition within the combustion chamber; and,
   providing an intake event during which the intake valve is open for ingesting fresh air into the combustion chamber.

30. The method of controlling a four-stroke internal combustion engine as claimed in claim 29 further comprising establishing recirculated exhaust gases within the combustion chamber during intake strokes.

31. The method of controlling a four-stroke internal combustion engine as claimed in claim 30 wherein establishing recirculated exhaust gases comprises internal exhaust gas recirculation.

32. The method of controlling a four-stroke internal combustion engine as claimed in claim 31 wherein internal exhaust gas recirculation comprises trapping exhaust gases within the combustion chamber through early exhaust valve closing.

33. The method of controlling a four-stroke internal combustion engine as claimed in claim 31 wherein internal exhaust gas recirculation comprises re-breathing into the combustion chamber through the exhaust valve opened during the intake stroke exhaust gases expelled into the exhaust passage through the exhaust valve opened during the exhaust stroke.

34. The method of controlling a four-stroke internal combustion engine as claimed in claim 31 wherein internal exhaust gas recirculation comprises re-breathing into the combustion chamber through the intake valve opened during the intake stroke exhaust gases expelled into the intake passage through the intake valve opened during the exhaust stroke.

35. The method of controlling a four-stroke internal combustion engine as claimed in claim 30 wherein establishing recirculated exhaust gases comprises external exhaust gas recirculation.

36. The method of controlling a four-stroke internal combustion engine as claimed in claim 12 wherein operating the variable valve system to control the intake and exhaust valves to effect in-cylinder conditions conducive to controlled auto-ignition comprises:
   providing exhaust events during which the exhaust valve is open for at least a portion of the exhaust stroke for expelling combusted gases from the combustion chamber;
   subsequent to the exhaust events during part load engine operation, providing simultaneous closure of the exhaust and intake valves for a period including a terminal portion of the exhaust strokes effective to trap and compress a portion of combusted gases within the combustion chamber, characterized by higher combustion chamber pressures at lower engine loads; and,
   providing intake events during which the intake valve is open for at least a portion of the intake stroke for ingesting fresh air into the combustion chamber.

\* \* \* \* \*